United States Patent
Kurbiel et al.

(10) Patent No.: US 12,352,597 B2
(45) Date of Patent: Jul. 8, 2025

(54) METHODS AND SYSTEMS FOR PREDICTING PROPERTIES OF A PLURALITY OF OBJECTS IN A VICINITY OF A VEHICLE

(71) Applicant: Aptiv Technologies AG, Schaffhausen (BB)

(72) Inventors: Thomas Kurbiel, Essen (DE); Maximilian Schaefer, Wuppertal (DE); Kun Zhao, Düsseldorf (DE); Markus Bühren, Erkrath (DE)

(73) Assignee: Aptiv Technologies AG, Schaffhausen (CH)

( * ) Notice: Subject to any disclaimer, the term of this patent is extended or adjusted under 35 U.S.C. 154(b) by 255 days.

(21) Appl. No.: 17/820,015

(22) Filed: Aug. 16, 2022

(65) Prior Publication Data

US 2023/0048926 A1 Feb. 16, 2023

(30) Foreign Application Priority Data

Aug. 16, 2021 (EP) .................................. 21191442

(51) Int. Cl.
*G01C 21/00* (2006.01)
*G01C 21/36* (2006.01)
(Continued)

(52) U.S. Cl.
CPC ....... *G01C 21/367* (2013.01); *G01C 21/3691* (2013.01); *G06V 20/58* (2022.01); *G06V 20/588* (2022.01)

(58) Field of Classification Search
CPC .. G01C 21/367; G01C 21/3691; G06V 20/58; G06V 20/588; G06V 20/582;
(Continued)

(56) References Cited

U.S. PATENT DOCUMENTS 9,248,835 B2 2/2016 Tanzmeister
11,521,396 B1 * 12/2022 Jain ..................... G06F 18/2415
(Continued)

OTHER PUBLICATIONS

Schreiber, Marcel, et al. "Long-Term Occupancy Grid Prediction Using Recurrent Neural Networks." 2019 International Conference on Robotics and Automation (ICRA), IEEE, 2019. https://arxiv.org/abs/1809.03782 (Year: 2019).*
(Continued)

*Primary Examiner* — Anne Marie Antonucci
*Assistant Examiner* — Jordan T Smith
(74) *Attorney, Agent, or Firm* — Harness, Dickey & Pierce, P.L.C.

(57) ABSTRACT

A computer-implemented method for predicting properties of a plurality of objects in a vicinity of a vehicle includes multiple steps that can be carried out by computer hardware components. The method includes determining a grid map representation of road-users perception data, with the road-users perception data including tracked perception results and/or untracked sensor intermediate detections. The method also includes determining a grid map representation of static environment data based on data obtained from a perception system and/or a pre-determined map. The method further includes determining the properties of the plurality of objects based on the grid map representation of road-users perception data and the grid map representation of static environment data.

18 Claims, 14 Drawing Sheets

(51) Int. Cl.
*G06V 20/56* (2022.01)
*G06V 20/58* (2022.01)

(58) Field of Classification Search
CPC ...... G06V 20/584; G06V 10/82; G01S 7/417; G01S 7/4802; G01S 7/4808; G01S 13/931; G01S 17/931; G01S 13/726; G06N 3/0442; G06N 3/0455; G06N 3/0464; G06N 3/09

See application file for complete search history.

(56) References Cited

U.S. PATENT DOCUMENTS

| | | | |
|---|---|---|---|
| 11,989,952 B2* | 5/2024 | Sun | G06F 18/24133 |
| 2019/0050653 A1* | 2/2019 | Natroshvili | G01S 17/50 |
| 2019/0113927 A1 | 4/2019 | England et al. | |
| 2020/0148215 A1 | 5/2020 | Mohajerin et al. | |
| 2020/0151564 A1* | 5/2020 | Nakhaei Sarvedani | G01S 17/86 |
| 2021/0101624 A1 | 4/2021 | Philbin et al. | |
| 2022/0057992 A1* | 2/2022 | Kawasaki | G06N 3/045 |
| 2022/0092983 A1* | 3/2022 | Hong | G05D 1/0278 |
| 2023/0043716 A1* | 2/2023 | Hotson | G06F 18/22 |

OTHER PUBLICATIONS

G. Balazs and W. Stechele, "Deep Grid Fusion of Feature-Level Sensor Data with Convolutional Neural Networks," 2019 IEEE International Conference on Connected Vehicles and Expo (ICCVE), Graz, Austria, 2019, pp. 1-6, doi: 10.1109/ICCVE45908.2019.8965213. (Year: 2019).*

Engel, Nico, et al. "Deep Object Tracking on Dynamic Occupancy Grid Maps Using RNNs." 2018 21st International Conference on Intelligent Transportation Systems (ITSC), IEEE, 2018, pp. 3852-3858. Crossref, https://doi.org/10.1109/itsc.2018.8569234. (Year: 2018).*

M. Toyungyernsub, M. Itkina, R. Senanayake and M. J. Kochenderfer, "Double-Prong ConvLSTM for Spatiotemporal Occupancy Prediction in Dynamic Environments," 2021 IEEE International Conference on Robotics and Automation (ICRA), Xi'an, China, 2021, pp. 13931-13937, doi: 10.1109/ICRA48506.2021.9561940. (Year: 2021).*

Lin, et al., "Focal Loss for Dense Object Detection", 2017 IEEE International Conference on Computer Vision (ICCV), Oct. 22-29, 2017, Venice, Italy, Electronic ISSN: 2380-7504, DOI: 10.1109/ICCV.2017.324, Dec. 25, 2017, 9 pages.

"Extended European Search Report", EP Application No. 21191442.9, Apr. 13, 2022, 18 pages.

Chai, et al., "MultiPath: Multiple Probabilistic Anchor Trajectory Hypotheses for Behavior Prediction", Oct. 12, 2019, 14 pages.

Chandra, "Forecasting Trajectory and Behavior of Road-Agents Using Spectral Clustering in Graph-LSTMs", Aug. 5, 2020, 8 pages.

Dequaire, et al., "Deep Tracking in the wild: End-to-end tracking using recurrent neural networks", The International Journal of Robotics Research, 37(4-5): 2018, Jun. 22, 2017, pp. 492-512.

Djuric, et al., "Uncertainty-aware Short-term Motion Prediction of Traffic Actors for Autonomous Driving", Mar. 2020, pp. 2095-2104.

Feng, et al., "Vehicle Trajectory Prediction Using Intention-based Conditional Variational Autoencoder Using Intention-based Conditional Variational Autoencoder", Oct. 2019, 6 pages.

Gupta, et al., "Social GAN: Socially Acceptable Trajectories with Generative Adversarial Networks", Mar. 29, 2018, 10 pages.

Hong, "Rules of the Road: Predicting Driving Behavior with a Convolutional Model of Semantic Interactions", Jun. 21, 2019, 9 pages.

Law, et al., "CornerNet: Detecting Objects as Paired Keypoints", Mar. 18, 2019.

Lee, et al., "DESIRE: Distant Future Prediction in Dynamic Scenes with Interacting Agents", Apr. 14, 2017, 10 pages.

Liang, et al., "Peeking into the Future: Predicting Future Person Activities and Locations in Videos", May 31, 2019, 13 pages.

Phan-Minh, et al., "CoverNet: Multimodal Behavior Prediction using Trajectory Sets", Apr. 1, 2020, 12 pages.

Ronnenberger, et al., "U-Net: Convolutional Networks for Biomedical Image Segmentation", May 18, 2015, 8 pages.

Sadeghian, et al., "SoPhie: An Attentive GAN for Predicting Paths Compliant to Social and Physical Constraints", Jun. 2018, pp. 1349-1358.

Schreiber, et al., "Dynamic Occupancy Grid Mapping with Recurrent Neural Networks", May 5, 2022, 8 pages.

Schreiber, et al., "Long-Term Occupancy Grid Prediction Using Recurrent Neural Networks", Jun. 7, 2019, 8 pages.

Van Der Heiden, et al., "SafeCritic: Collision-Aware Trajectory Prediction", Oct. 15, 2019, 8 pages.

* cited by examiner

METHODS AND SYSTEMS FOR PREDICTING PROPERTIES OF A PLURALITY OF OBJECTS IN A VICINITY OF A VEHICLE

INCORPORATION BY REFERENCE

This application claims priority to European Patent Application Number 21191442.9, filed Aug. 16, 2021, the disclosure of which is incorporated by reference in its entirety.

BACKGROUND

Predicting future locations of an object is an important task in various applications, for example in (at least partially) autonomous driving.

Accordingly, there is a need to provide efficient and reliable methods for predicting future locations of one or more objects in a scene.

SUMMARY

The present disclosure relates to methods and systems for predicting properties of a plurality of objects in a vicinity of a vehicle.

The present disclosure provides a computer-implemented method, a computer system, and a non-transitory computer-readable medium according to the independent claims. Example embodiments are given in the subclaims, the description, and the drawings.

In one aspect, the present disclosure is directed at a computer-implemented method for predicting properties of a plurality of objects in a vicinity of a vehicle, the method comprising the following steps carried out by computer hardware components: determining a grid map representation of road-users perception data, the road-users perception data comprising at least one of tracked perception results or untracked sensor intermediate detections; determining a grid map representation of static environment data based on data obtained from at least one of a perception system or a pre-determined map; and determining the properties of the plurality of objects based on the grid map representation of road-users perception data and the grid map representation of static environment data.

Untracked sensor intermediate detections may for example include radar data or camera data. For radar data, radar detections may include points, each point being a reflection of the radio wave sent out by radar, wherein metal objects have stronger reflection, and thus result in more detection points, so that these points can be located at any random position of the vehicle, and the number of detected points is also variable and random. For camera data as intermediate detection, methods may work on images and may normally detect multiple bounding boxes around a target, e.g. a vehicle, wherein these boxes may only differ from each other slightly, but they all come from the same object. In both radar data and camera data, these detections may be tracked, for example through a Kalman Filter, and after tracking, a track may be obtained, which corresponds to the vehicle, with some physical properties estimated, such as position or speed. The untracked sensor intermediate data may include data that has not gone through such tracking.

According to another aspect, the properties of the plurality of objects are determined as a function of at least one variable point in time for which the properties are determined.

According to another aspect, the properties of the plurality of objects are determined in the form of $Y(t)=At^2+Bt^1+C$, wherein $Y(t)$ denotes the properties (as a function of t), t denotes at least one point in time for which the properties are determined, and A, B, and C are constants, which are preferably used for sampling or interpolation or extrapolation at the variable time t, and which are preferably determined as variable output of a network.

According to another aspect, the properties can also be determined for discrete times (so that A and B are canceled out), wherein t may be a time taken from a point set T. In the discrete form, the output may be a set of properties predicted (for each such discrete and fixed time) by the network, and may be denoted as $Y=\{C_t\}, t\in T$.

According to another aspect, the properties are determined for a past point in time and/or a present point in time and/or a future point in time.

According to another aspect, the properties of the plurality of objects comprises a probability matrix, wherein each entry of multiple entries of the probability matrix is related to a respective pre-determined region in the vicinity of the vehicle and indicates a probability of an object being present in the respective region at a time different from the pre-determined time, wherein the computer-implemented method further comprises determining an offset to the center of the region for each entry of the multiple entries of the probability matrix, wherein preferably the offsets are determined using a regression method.

According to another aspect, the grid map representation of road-users perception data is determined further based on data from a perception system, and/or the grid map representation of static environment data is determined further based on a pre-determined map.

According to another aspect, the grid map representation of road-users perception data is encoded using a dynamic context encoder, wherein the grid map representation of static environment data is encoded using a static context encoder, and wherein the properties of the plurality of objects is decoded using a decoder. For example, a recurrent neural network is provided between the dynamic context encoder and the static context encoder, and a dilated neural network is provided between the static context encoder and the decoder; or a recurrent neural network and a dilated neural network are provided between the static context encoder and the decoder.

According to another aspect, the computer-implemented method for classification comprises using a machine learning method, preferably an artificial neural network, preferably comprising a plurality of skip-connections with temporal filtering in a pyramid neural network architecture, wherein preferably the machine learning method is trained based on training data, with the training data comprising traffic situations of a plurality of objects moving over a plurality of time frames.

According to another aspect, the properties of the plurality of objects are determined for a plurality of classes, wherein the plurality of object classes comprise at least two of an ego vehicle class, a pedestrian class, a bicyclist class, a vehicle class, a truck class, a lorry class, a fast moving object class, or a slow moving object class.

According to another aspect, the properties of the plurality of objects comprise at least one of positions, speeds, heading angles, intentions, or collision risk values.

According to another aspect, the computer-implemented method is used for fusion or for prediction. For example, the input may come from various sensors, and then the method may be used as a fusion method (for example in a fusion system).

In a further aspect, the present disclosure is directed at a computer-implemented method for predicting properties (for example positions, velocities, heading angles, driving intentions, or collision risk values) of a plurality of objects (which may, for example, be of a plurality of classes) in a vicinity of a vehicle, the method comprising the following steps performed (in other words: carried out) by computer hardware components: determining at least one input map comprising a representation of the vicinity of the vehicle at a pre-determined time; and based on the at least one input map, determining a function in time indicating a probability of an object being present in the respective region at a time t different from the pre-determined time, wherein the function in time comprises a constant portion, wherein the constant portion is determined by applying a classification method to the at least one input map, with the classification method providing as an output a probability matrix, wherein each entry of the probability matrix is related to a respective pre-determined region in the vicinity of the vehicle and indicates a probability of an object being present in the respective region at a time t different from the pre-determined time, and wherein the classification method determines a plurality of functions in time and a plurality of probability matrices, with each function in time and each probability matrix related to one of a plurality of object classes, each class comprising a plurality of objects.

In other words, a multimodal future position prediction (for example of multiple agents) based on given context information may be provided. It will be understood that "multimodal" future position prediction may mean that multiple future positions are feasible for a single agent. A technique for predicting future positions of multiple objects for different future points in time may be provided.

According to another aspect, the at least one map comprises a map indicating a static context of the vicinity. For example, the static context may represent objects which do not move (for example roads, buildings, or trees). The static context may represent the environment which restricts the movement of the road users and is not affected by the road users. For example, the static context may include objects which do not move (for example roads, buildings, or trees). The static context may also include traffic rules. The static context may include objects which are dynamic, for example standard traffic lights or weather conditions. All of this static context affects the road users, and road users' behavior does not affect the static context.

According to another aspect, the at least one map comprises a map indicating a dynamic context of the vicinity. The dynamic context may represent objects which move, for example other traffic participants.

The dynamic context may include the whole road users' state, which may also include the ego vehicle. If one specific road user's future trajectory is to be predicted, then all other road users may be considered as his dynamic context.

According to various embodiments, all the road users may be predicted jointly, thus their overall trajectories are considered as dynamic context of the scene.

The ego vehicle's movement may be part of the dynamic context, and it may be treated equally as other road users in the dynamic context input grid map.

Furthermore, the ego vehicle's movement may also be used indirectly for data preprocessing. From the ego vehicle perception system, the other road users' trajectories may be provided in the ego vehicle coordinate system (VCS). The ego vehicle may be moving, and thus, the perception at each frame may be represented in coordinate systems which itself are moving. According to various embodiments, the ego dynamic (which may be or may include the ego vehicle's movement) may be used to compensate the other users' trajectories and transform them into a world coordinate system (WCS); in this case, the trajectory data from multiple past time frames may have the same fixed coordinate system. This way, the ego dynamics may indirectly be used as input (for example for preprocessing of the perception result of other road users).

According to another aspect, the classification method comprises a machine learning method, preferably an artificial neural network. The machine learning method may be trained using recorded movement scenes.

According to another aspect, the machine learning method is trained based on training data, the training data comprising traffic situations of a plurality of objects moving over a plurality of time frames.

According to another aspect, the machine learning method is trained based on a loss function, wherein the loss function preferably comprises a pixel-wise distance aware cross entropy.

According to another aspect, the classification method determines a plurality of probability matrices, each probability matrix related to one of a plurality of object classes.

According to another aspect, the plurality of object classes comprise at least two of an ego-vehicle class, a pedestrian class, a bicyclist class, a vehicle class, a truck class, a lorry class, a fast moving object class, or a slow moving object class.

According to another aspect, the probability matrix is related to a center of the respective pre-determined region, and the computer-implemented method further comprises the following step carried out by the computer hardware components: determining an offset to the center of the region for each of the multiple entries of the probability matrix.

According to another aspect, the offset is determined based on a regression loss. The determination of the offset (based on the regression loss) may allow minimizing a difference between a predicted location and an actual location, by allowing for a higher spatial resolution than provided by the cells (in other words: pixels) of the images or matrices used in the classification method.

According to another aspect, a plurality of probability matrices are determined related to a plurality of times different from the pre-determined time.

According to another aspect, the computer-implemented method further comprises the following step carried out by the computer hardware components: determining an occupation matrix, wherein each entry of the occupation matrix is related to a respective pre-determined region in the vicinity of the vehicle and indicates whether or not an object is present at the region, and wherein a corresponding entry of the probability matrix is only determined if the entry of the occupation matrix indicates that an object is present at the region. It has been found that this increases efficiency.

The method may support trajectory prediction of an arbitrary number of road users in one general approach. The computing effort does not depend on the number of road users which may be a considerable advantage to state-of-the art approaches. The method may support the prediction of various types of traffic participants, e.g. cars, pedestrians, bicycles etc. and may take multimodality (prediction of many possible future positions) into account.

In another aspect, the present disclosure is directed at a computer system, said computer system comprising a plurality of computer hardware components configured to carry out several or all steps of the computer-implemented method described herein. The computer system can be part of a vehicle.

The computer system may comprise a plurality of computer hardware components (for example a processor, for example processing unit or processing network, at least one memory, for example memory unit or memory network, and at least one non-transitory data storage). It will be understood that further computer hardware components may be provided and used for carrying out steps of the computer-implemented method in the computer system. The non-transitory data storage and/or the memory unit may comprise a computer program for instructing the computer to perform several or all steps or aspects of the computer-implemented method described herein, for example using the processing unit and the at least one memory unit.

In another aspect, the present disclosure is directed at a vehicle comprising the computer system as described herein and a sensor configured to provide information for determining the at least one map.

In another aspect, the present disclosure is directed at a non-transitory computer-readable medium comprising instructions for carrying out several or all steps or aspects of the computer-implemented method described herein. The computer-readable medium may be configured as: an optical medium, such as a compact disc (CD) or a digital versatile disk (DVD); a magnetic medium, such as a hard disk drive (HDD); a solid state drive (SSD); a read only memory (ROM), such as a flash memory; or the like. Furthermore, the computer-readable medium may be configured as a data storage that is accessible via a data connection, such as an internet connection. The computer-readable medium may, for example, be an online data repository or a cloud storage.

The present disclosure is also directed at a computer program for instructing a computer to perform several or all steps or aspects of the computer-implemented method described herein.

As described herein, a general motion prediction framework is provided. The system jointly predicts all the road users' future motion in the scene, with its complexity invariant to number of road users. Furthermore, a network architecture is provided to enable efficient learning of the motions from various type and number of road users, who could have totally different maneuverability. For example, a pedestrian may change its direction rapidly but moves slower compared to a vehicle.

BRIEF DESCRIPTION OF THE DRAWINGS

Example embodiments and functions of the present disclosure are described herein in conjunction with the following drawings, showing schematically.

DETAILED DESCRIPTION

According to various embodiments, predicting the future positions (for example in 1 second, 2 seconds, etc.) of the ego vehicle or other objects (for example pedestrians or vehicles), given the past trajectory and surroundings may be provided.

As input data, the static context (for example including road boundaries, traffic signs, traffic lights) and/or the dynamic context (for example information about other traffic participants, including for example pedestrians, cars, trucks, and bikes) and/or ego dynamic (in other words: the dynamics of the ego vehicle) may be available.

A problem, for which solutions are provided according to various embodiments, is that there does not exist only one possible future position, but a multitude of different possible future positions, depending e.g. on multiple possible paths, different acceleration patterns, interactions with other traffic participants, etc.

According to various embodiments, the problem of motion prediction for various numbers and types of road user in complex driving scenarios is solved by treating this problem as an image generation problem. The methods and systems according to various embodiments may be applied in various driving scenarios, including, e.g., highway, urban, etc. The system complexity is invariant to the number and types of the road users in the application scene.

In contrast to methods and systems which cover only one road user, the methods and systems according to various embodiments can cover all the road users. Thus, even for a plurality of road users, the method does not have to be repeatedly applied, which results in an improved system complexity. An empty highway with only one vehicle compared to a crowded urban intersection with lots of pedestrians and various type of vehicles will result in the same system requirements.

According to various embodiments, the methods and systems jointly predict all the road users' motion in a scene and at the same time have a manageable complexity.

Figure 1:
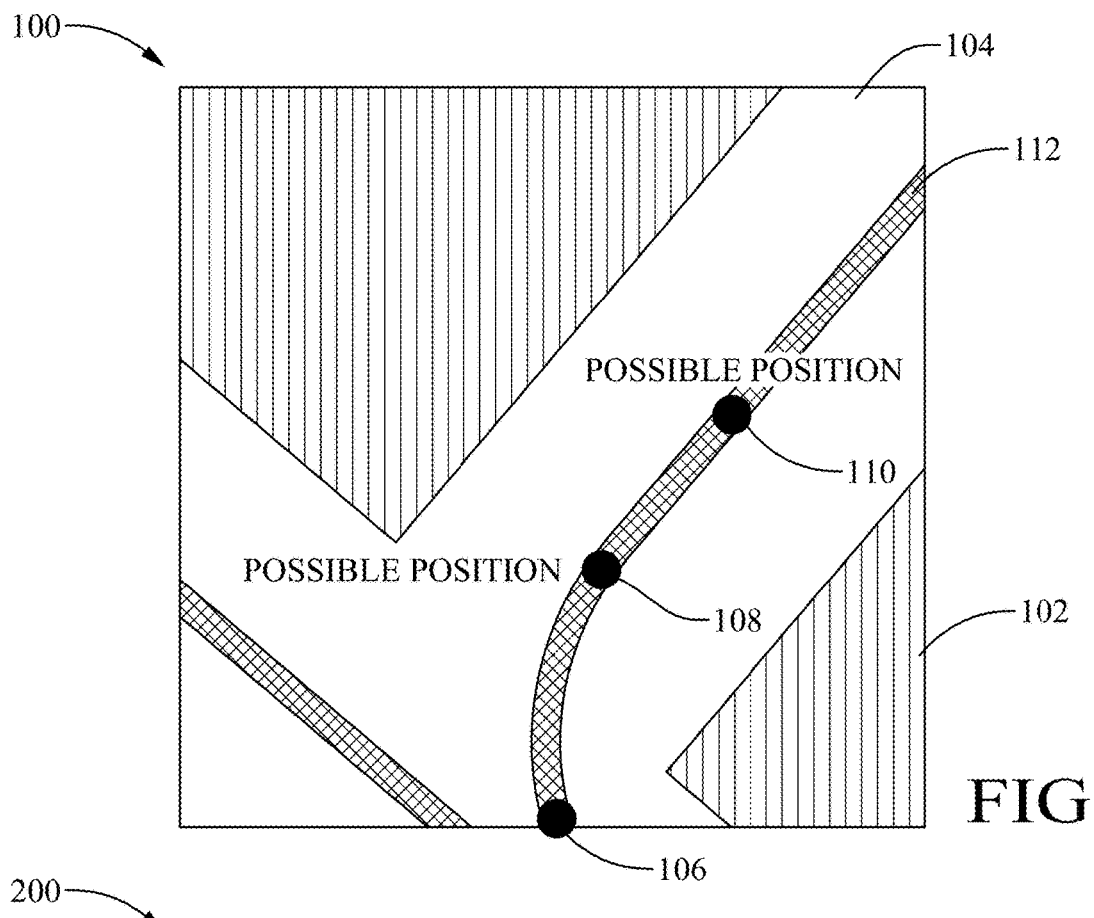
FIG. 1 is an illustration of a minimalistic static map consisting only of drivable areas and center lines.

FIG. 1 shows an illustration 100 of a static map, including a road 104 with non-drivable areas (which may also be referred to as obstacles 102), and various possible positions 106, 108, 110, which may be assembled to a future trajectory 112.

A huge challenge to achieve the above task with Deep Learning tools is the nature of the training data. Various Deep Learning approaches are trained on trajectory data to achieve this task. However, trajectory data captured by sensor systems is highly imbalanced, since by far most of the trajectories follow straight lines with an approximately constant velocity. Without preprocessing of the data, the neural networks may learn only to predict straight lines. However, it is the abnormal behaviors (for example "unexpected stops", "accelerations", "turnings", "deviation from standard routes") which may be of interest. Such deviations from standard routes may be taken into account according to various embodiments.

According to various embodiments, many possible positions for multiple agents (multimodality) may be predicted, and a respective probability may be assigned to each of them.

The ability to predict multiple possible future positions of the ego vehicle and other vehicles given the surrounding context while also estimating their probabilities may, for example, be used to provide safe autonomous driving.

According to various embodiments, devices and methods may be provided for prediction of different multimodalities, including determining probabilities which are assigned to the predictions.

According to various embodiments, the static (input) map (for example as illustrated in FIG. 1) may be (sub)divided into a grid with a plurality of cells, for example 10×10 cells. The output (in other words: output map) may first be an empty grid map, which does not necessarily correspond to the exact same area as the input static map. In some cases, only the cell number of the output map, where the ego vehicle will be in the future, may be predicted. This is a classification task, where each class is a different cell of the grid. This could be called "coarse" prediction. It will be understood that the static information is not necessarily provided in the output grid map.

The classification task may be carried out for each pixel in the output grid map (wherein each pixel corresponds to one cell). The pixels may indicate spaces occupied by any road users.

Figure 2:
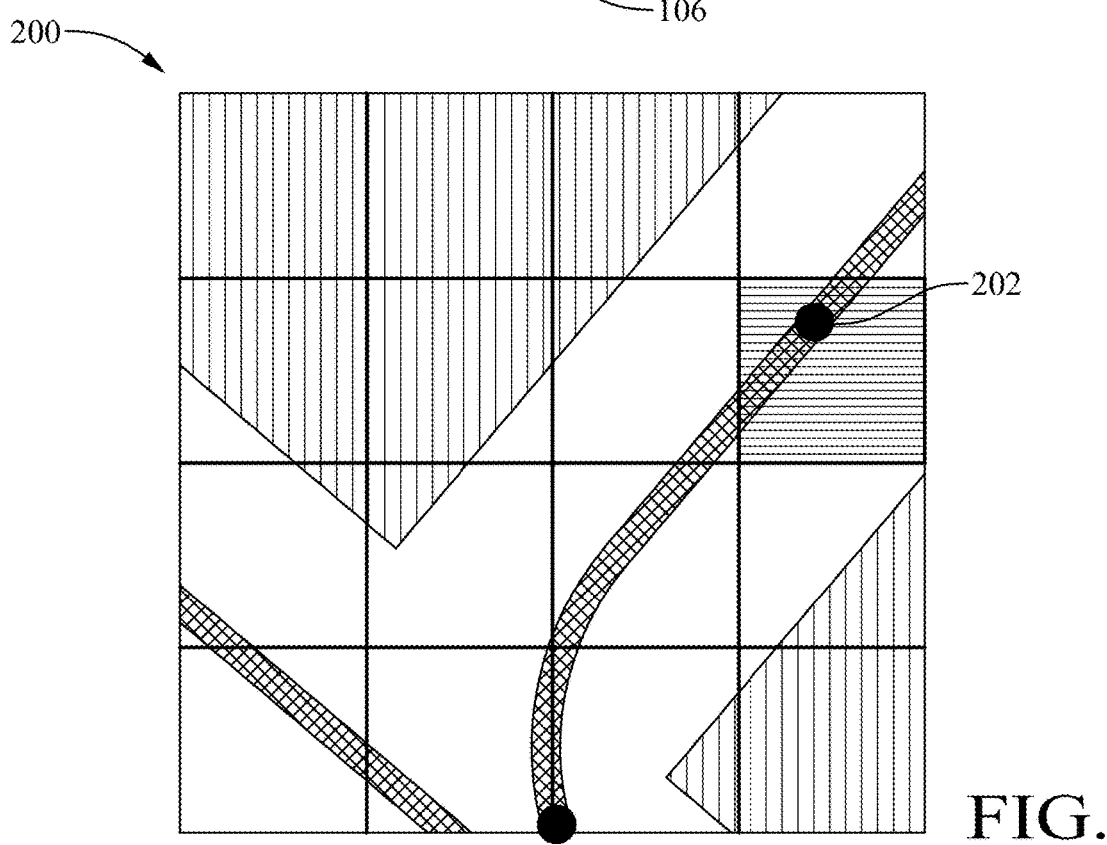
FIG. 2 is an illustration of the static map with a cell highlighted corresponding to possible future positions.

FIG. 2 shows an illustration 200 of the static map of FIG. 1, with a cell highlighted corresponding to the possible position 202.

The problem to assign a probability to each future prediction is solved according to various embodiments. The problem of imbalanced datasets is also solved according to various embodiments, since classification problems can cope with that problem much better (for example as described in more details when explaining the focal loss of Lin et. al.).

According to various embodiments, to refine the prediction to be more accurate, offsets to the actual positions may be provided (for example by the network employed according to various embodiments).

Figure 3:
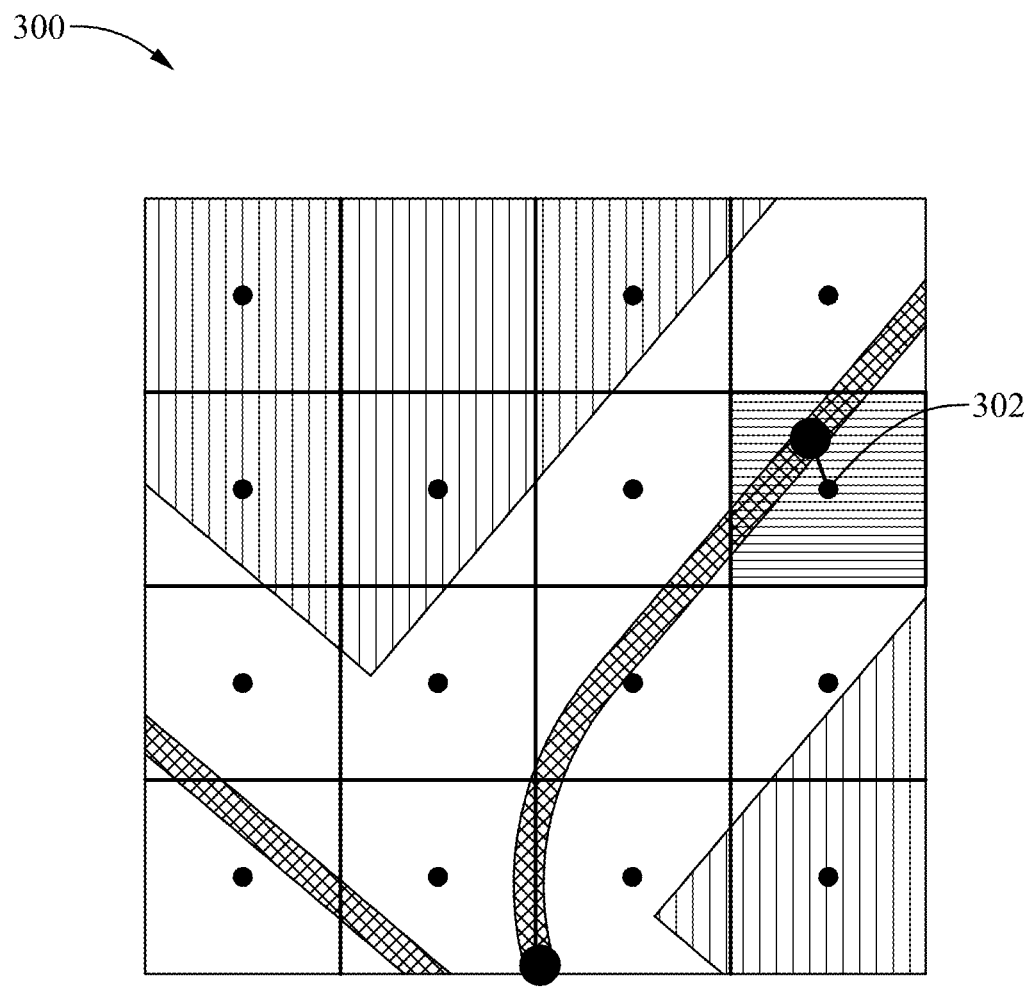
FIG. 3 is an illustration of the static map, wherein the offset of a future position with respect to the cell center is illustrated.

FIG. 3 shows an illustration 300 of the static map of FIG. 1 and FIG. 2, wherein a center 302 of the cell corresponding to the possible position 202 is illustrated. The offset may be provided relative to the center of each cell.

Providing an offset for each cell may make the regression problem much easier, since only small offsets to the actual positions are predicted.

The approach according to various embodiments was evaluated on real datasets and yielded results better than currently available.

According to various embodiments, a multi-class output structure may be provided. The grid output representation may allow for multi-modality prediction. Prediction of more than a single-target trajectory prediction may be provided, so as to provide a whole scene prediction system. By the use of the output structure according to various embodiments, the trajectory of a variable number of road users of different types at the same time for multiple time steps may be possible.

As described above, the surroundings of an ego vehicle may be divided into a 2D (two-dimensional) grid (for example a grid of size 80×80 with a resolution of 1 m) and the trajectories may be rasterized into an image-like structure. For each grid cell, the probability of a road user occupying it in the future may be predicted (which may be a classification task) for multiple time steps. By predicting an offset for each grid cell (which may be a regression task), an accuracy that is below the resolution of the 2D grid may be achieved.

The input data of the method according to various embodiments may be subdivided into the following major categories: static context, dynamic context, and dynamics of the ego vehicle.

Figure 4:
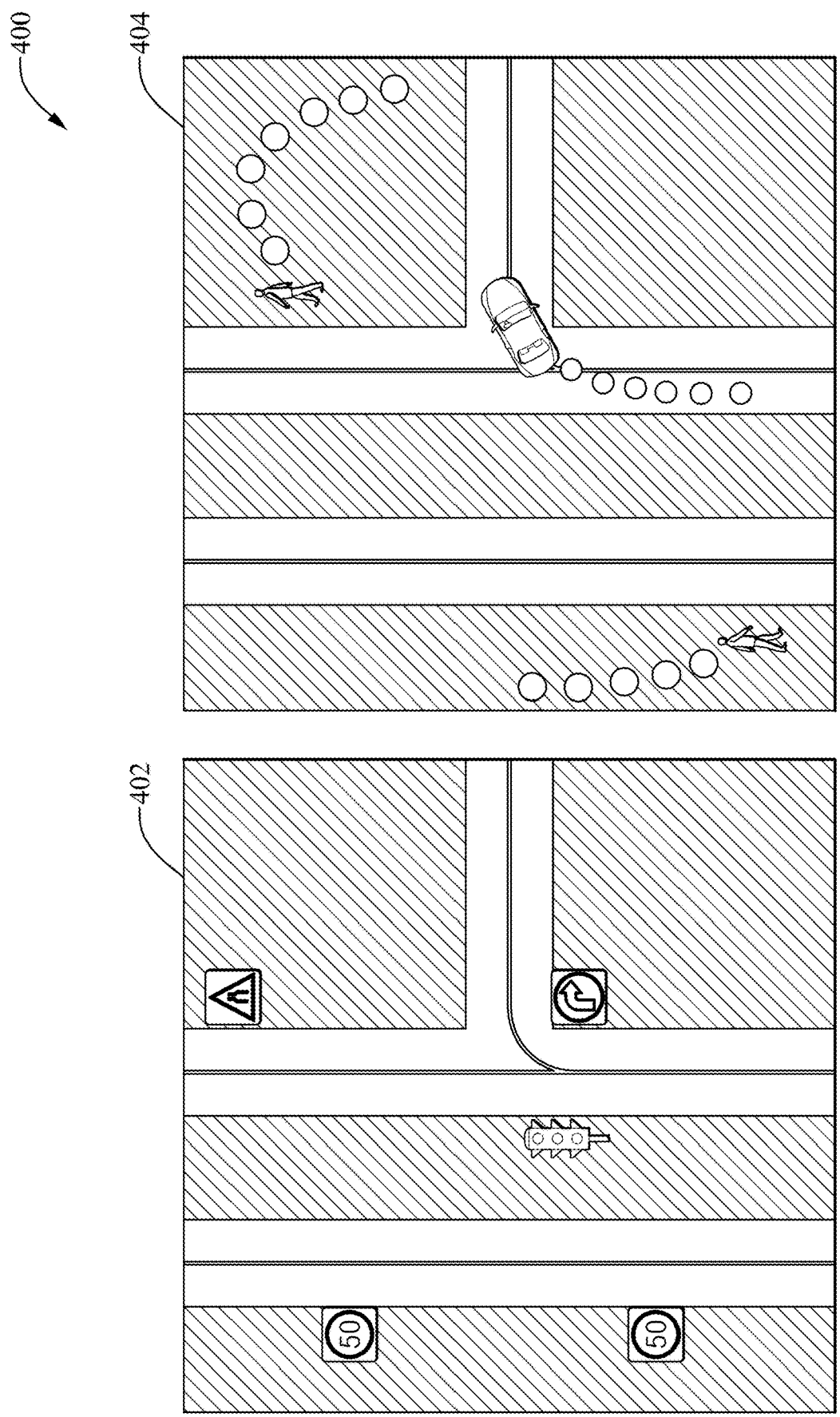
FIG. 4 is an illustration of the static context and the dynamic context according to various embodiments which may be used for predicting future positions of the ego vehicle.

FIG. 4 shows an illustration 400 of the static context 402 and the dynamic context 404 according to various embodiments.

The static context may include static information or static objects (for example information or objects, which do not change from one time frame to another). For example, the static context may include lane and road boundaries, traffic signs, and/or traffic lights. Data of the static context may be available in today's vehicles; it may be provided either by state-of-the-art sensors or by offline maps combined with a localization of the vehicle, e.g. via GPS (global positioning system) or IMU (inertial measurement unit).

The dynamic context may include dynamic information or dynamic objects (for example information or objects, which may change or may be different from one time frame to another). For example, the dynamic context may include traffic participants like pedestrians, car, and/or bikes. The dynamic context may include some or all the measurements describing the dynamics of an object (for example coordinates, velocity, acceleration and/or yaw-rate). Data of the dynamic context may not only include the current measurement, but also may include past measurements. The accumulation of the past may allow for a refined assessment of the dynamics of the single objects. Data of the dynamic context may be available in today's vehicles; it may be provided by state-of the-art sensors.

Furthermore, the class (for example "pedestrian", "bicycle", "car", "truck") of an object may be used as an additional input. This may take the different dynamics of traffic participants of different classes into account. This may further allow for a refined assessment of the dynamics of the single objects. This category of data may be available in today's vehicles, and it may be provided by state-of-the-art sensors.

According to various embodiments, devices and methods may be provided which jointly predict future positions of multiple objects (of all the objects present in the input) for different future points in time, which may be possible due to the output structure according to various embodiments as described below.

Figure 5:
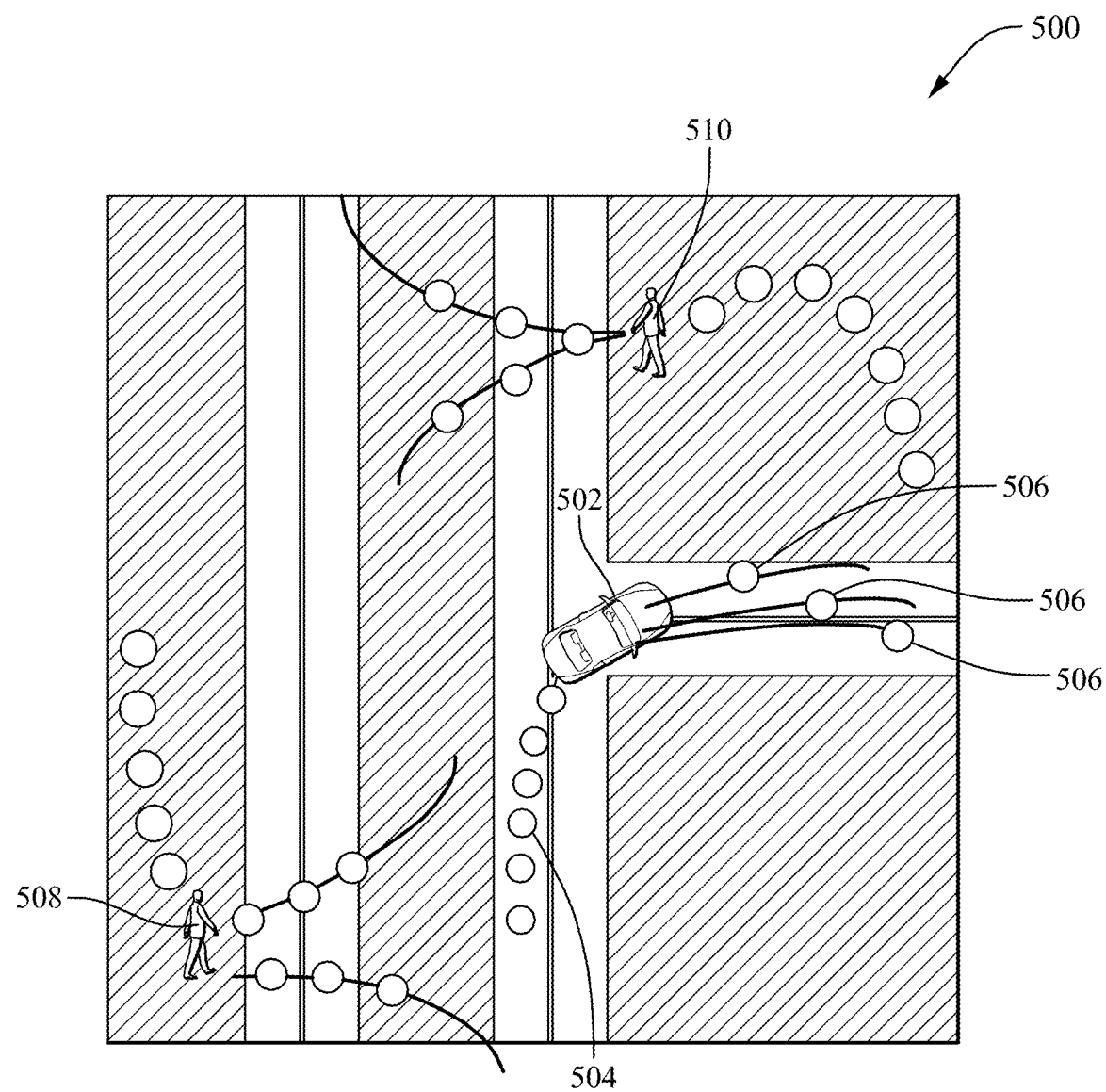
FIG. 5 is an illustration of a whole scene prediction system according to various embodiments.

FIG. 5 shows an illustration 500 of a whole scene prediction system according to various embodiments. For example, future positions may be predicted for a vehicle 502 and two pedestrians 508, 510. For example, a past trajectory 504 of the vehicle 502 may be used to determine potential future positions or future trajectories of the vehicle 502. For example, various positions 506 in a next point of time may be predicted; for example, the positions 506 illustrated in FIG. 5 may be the positions with the highest determined probability. For example, a pre-determined number of future trajectories may be determined (for example three as illustrated in FIG. 5 for the vehicle 502). Alternatively, a future position or future trajectory may be taken into account if the probability is higher than a pre-determined threshold, so that the number of possible future positions is flexible (depending on the probability of the future positions).

According to various embodiments, for the task of trajectory prediction, a grid based output structure may be defined which allows to jointly predict the trajectory of a variable number of road users of different types (pedestrian, vehicles, bicycles, etc.) in a scene for multiple time steps.

The output structure may be defined as $I^{T \times W \times L \times F}$, where:

T may describe the number of predicted future time steps
   $T \in \mathbb{N}^+$, e.g. T=2: Prediction for two future time steps (for example for 1 s and 2 s ahead).

W×L may set the size of the 2D grid, defining the region of interest (ROI, which may be the region where it may be desired to get a trajectory prediction for all road users)

Each grid cell (defined by W×L, with width W and length L) may correspond to a position where an object can be located at a future time step t.

For example, a ROI may be 80×80 m around the ego vehicle. To calculate W and L, the chosen resolution is considered. For example, if the resolution is 0.1 m, the dimension of (W×L) would be (800×800).

F may define the output features for every grid cell:
   F={C, $o_x$, $o_y$, cov} where:
   C may be a set of classes, e.g.:
      C={$c_{Pedestrian}$, $c_{Vehicle}$, $c_{Truck}$, $c_{Bicycle}$}
   $o_x$, $o_y$ may describe the offset in x and y direction from the centre of a grid cell to refine the actual position within a grid cell (or even outside the present cell).
   cov may be the covariance of x and y.

I(t, w, l, c)=p may describe the probability $p \in [0, 1]$ that the grid cell at (w, l) is occupied at the future time step t from an object of the class c.

Figure 6:
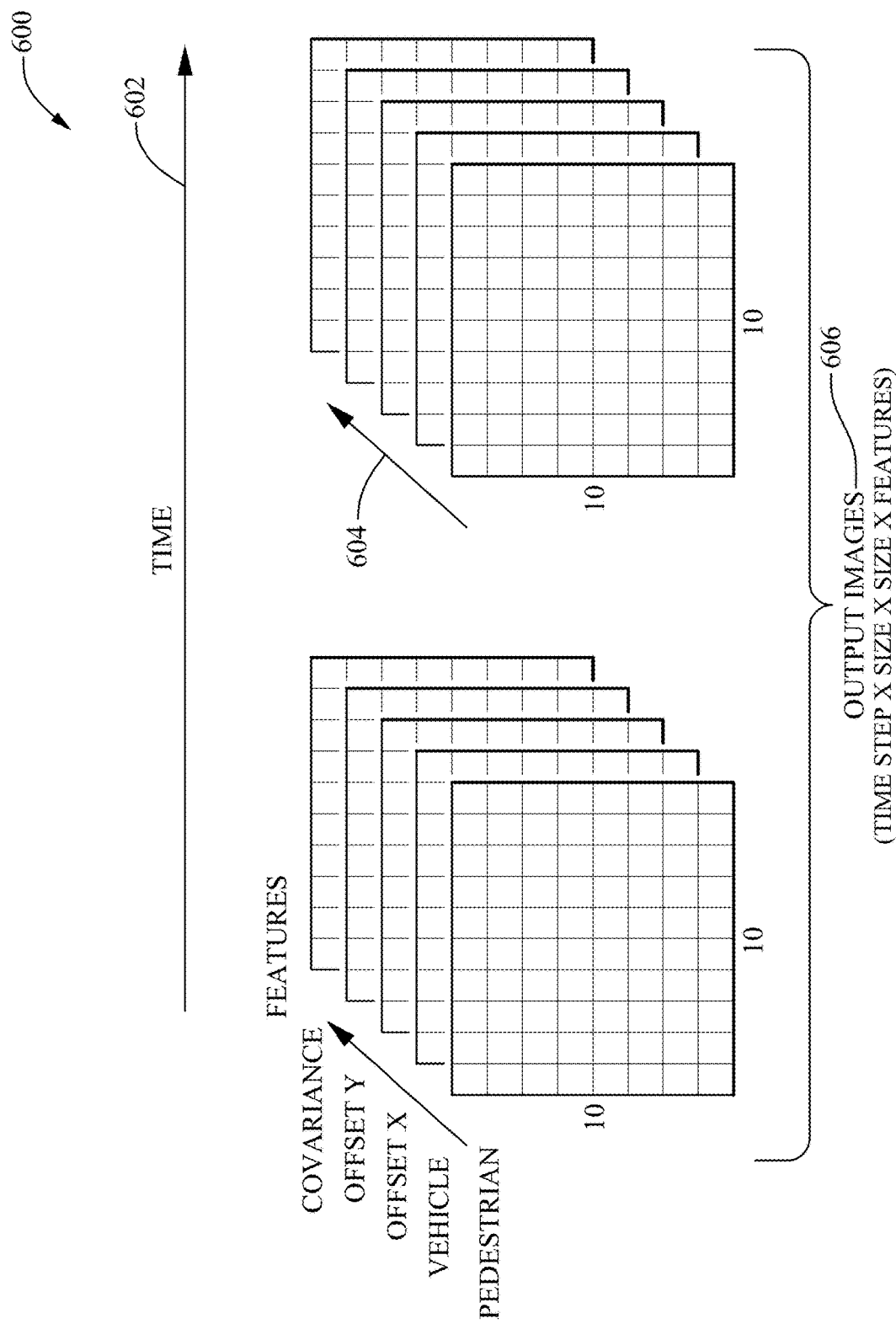
FIG. 6 is an illustration of the output structure according to various embodiments for motion prediction of all objects from multiple classes.

FIG. 6 shows an illustration 600 of the output structure according to various embodiments for motion prediction of all objects from multiple classes (for example pedestrian and vehicle) for two time steps ahead. For demonstration purposes, a small ROI of 10×10 m with a resolution of 1 m was chosen. It will be understood that the size of the ROI may be variable. The output structure according to various embodiments may also allow a variable number of classes and predicted time steps.

In FIG. 6, the time is shown along axis 602, and various features are illustrated as images along direction 604. Over the two time steps, a plurality of output images 606 may be provided.

Figure 7:
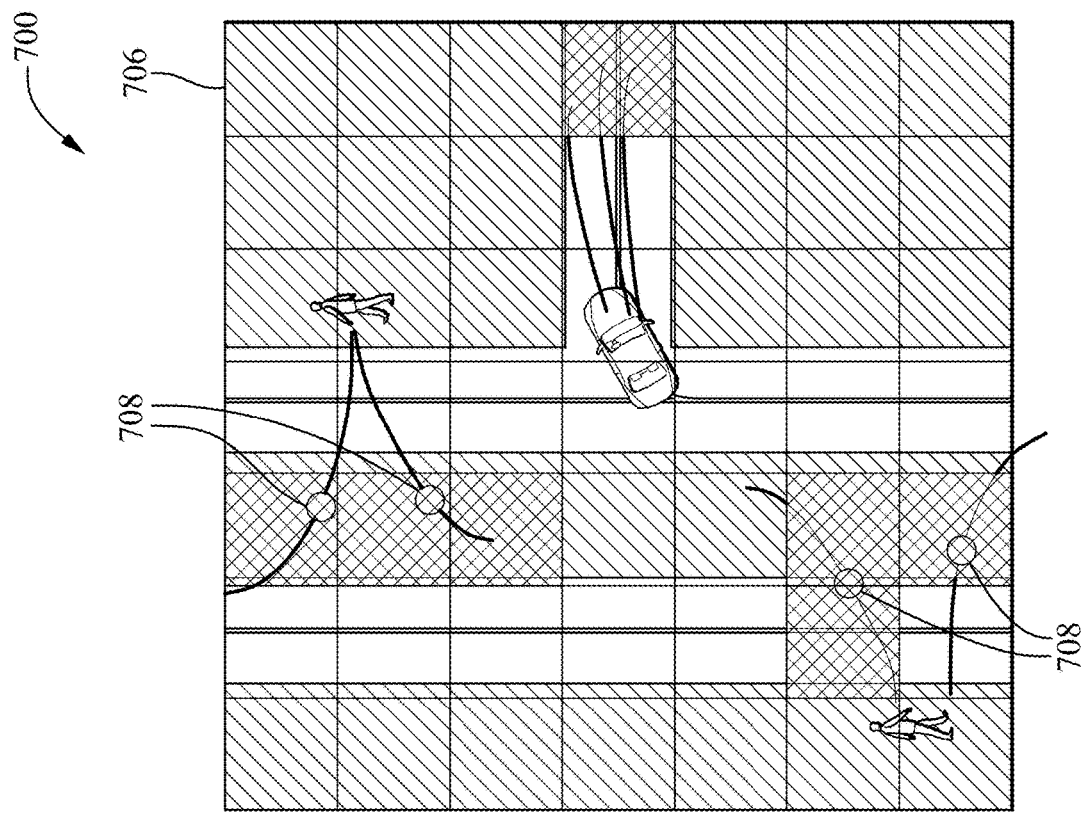
FIG. 7 is an illustration of the classification output to jointly predict future positions of multiple objects considering their multimodality according to various embodiments.
Figure 7:
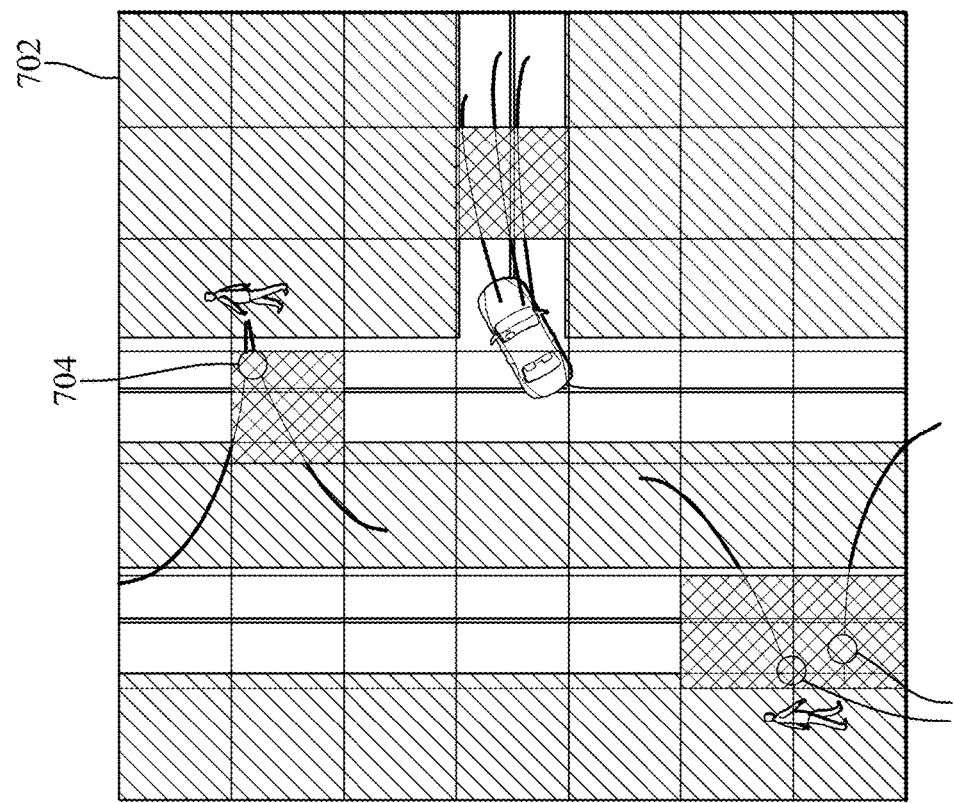

Due to the randomness of many traffic situations, there may exist many possible future positions (which may be called modalities), which the system may account for. Each of the possible future positions may usually have different probabilities of occurrence. The method according to various embodiments may be accounting for the multimodality by outputting a probability density defined on a grid, wherein each cell represents a specific location, as illustrated in FIG. 7. As described above, each cell may alternatively or additionally include the covariance of x and y, and it may thus describe a probability density.

FIG. 7 shows an illustration 700 of the classification output to jointly predict future positions of multiple objects considering their multimodality according to various embodiments. In the left image 702, probabilities for positions 704 at a time of 1 s in the future are illustrated. In the right image 706, probabilities for positions 708 at a time of 2 s in the future are illustrated. The future positions may be assembled to trajectories. As illustrated in FIG. 7, several possible future trajectories may be identified.

According to various embodiments, the input includes trajectories of a plurality of road users, and the output is a grid map for occupancy. Each cell pixel in the prediction (i.e., the grid map for occupancy) may not have the corresponding relationship with the original track, so the assignment to the original track is lost. According to various embodiments, post-processing may be provided to assign the predicted grid cell to the original tracks to recover a predicted trajectory.

According to various embodiments, a loss function for (artificial) neural network (NN) based training may be provided. The loss function may be minimized during training; for example, parameters of the NN may be determined so that the loss function takes a minimum. The ground truth for each prediction time horizon may be considered as an image, wherein only at the image positions occupied by a road user, it has values (different from 0). The remaining pixels may be empty (in other words: have a value of 0).

According to various embodiments, the classification may be applied on a grid-cell-level where each grid cell (in the following also called pixel) is assigned a probability p of an object being there at time step t.

As a (classification) loss function, a pixel-wise distance aware cross entropy may be used, for example from the work of Law et al. (CornerNet: Detecting Objects as Paired Keypoints, ECCV 2018) which was originally used for the task of object detection.

In comparison to Law et al., according to various embodiments, the factor a may be added in the loss for the case of a positive label respectively (1-α) for a label from the negative class based on the focal loss from Lin et al. work to cope with class imbalance (since most of the pixels may have a label from the negative class, meaning they will not be occupied in the future).

According to various embodiments, the classification loss DCE may be defined as follows:

$$DCE(p) = \begin{cases} -\alpha \cdot (1-p)^\gamma \cdot \log(p) & \text{if } y = 1 \\ -(1-\alpha) \cdot (1-y)^\beta \cdot p^\gamma \cdot \log(1-p) & \text{else} \end{cases}$$

wherein
y may be a label (in other words: ground truth; i.e., including information of the actual class):
   $y \in [0,1]$
   y=1: Label of the positive class (e.g., pedestrian)

y<0: Label of the negative class (e.g., no pedestrian)

p may be a probability of the specific class (e.g., pedestrian) at a pixel

α may be a factor to handle class imbalance

β,γ may be hyper-parameters to weigh factors

α,β,γ are hyper-parameters and may be tuned (for example may be defined empirically, for example by testing and tuning).

Figure 8:
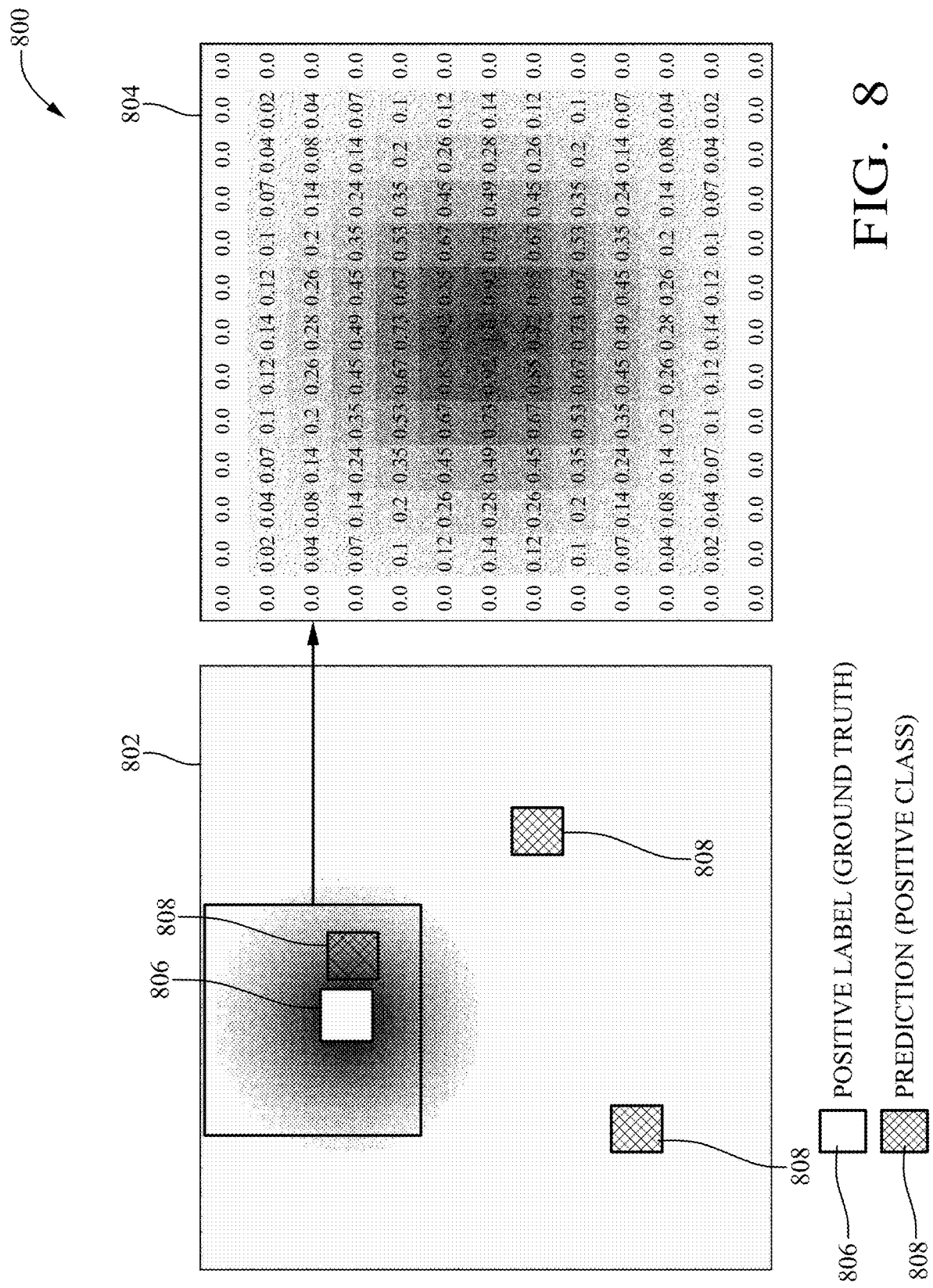
FIG. 8 is an illustration of predictions and a target and is an example of a gaussian kernel around the positive class label.

Around each positive label (y=1), a gaussian kernel may be defined as illustrated in FIG. 8. When a prediction for the positive class is in the proximity of a positive label, 0<y<1, the loss is reduced by the factor (1-γ). The kernel's output value may be the value y.

FIG. 8 shows an illustration 800 of predictions 808 and a target 806 (in the left image 802) and an example of a gaussian kernel (in the right image 804) around the positive class label 806, which weighs false positive predictions.

The size of the gaussian kernel may be determined by its standard deviation σ. According to various embodiments, a σ which is based on the current velocity of an object and the time step of the prediction may be used:

$$\sigma(v_x) = \frac{\sigma_{max}}{v_{max}} \cdot v_x + \sigma_t$$

wherein v may be the velocity of the object x, and $\sigma_t$ may be the initial σ based on the time step t.

The kernel may be a kernel other than a Gaussian kernel, and it may not necessarily be related to a normal distribution. Thus, the kernel may be described using a covariance matrix. Thus, the axis may have different lengths, and it could be rotated. $\sigma_x$ may be different from $\sigma_y$, which may also be rotated. The rotation may be determined by the heading/yaw of an object at a specific time. $\sigma_x$, $\sigma_y$ and $\sigma_{xy}$ may be calculated from $v_x$ and $v_y$.

The classification loss for a class may be summed over all pixels of the 2D grid and divided through the number of objects in the scene.

The distance aware cross entropy in combination with gaussian kernels around positive labels (for example based on velocity and how far in time a prediction is) may allow the artificial neural network to predict an uncertainty and encourages multimodality in the prediction, e.g. at intersections where a vehicle could turn or drive straight.

According to various embodiments, further to the classification loss, a regression loss may be defined.

By predicting an offset in x and y from the centre of a pixel, the position may be refined and an accuracy below the resolution rate of the 2D grid may be obtained.

The regression loss may be defined as follows:

$$R_x(x)=(\hat{x}-x)^2 \cdot \eta$$

$$R_y(y)=(\hat{y}-y)^2 \cdot \eta$$

$$R=R_x+R_y$$

wherein $R_x$, $R_y$ may be the regression loss for the offset in x and y direction, $\hat{x}$, $\hat{y}$ may be the ground truth offset in x and y direction, x, y may be the predicted offset in x and y direction, η may be an object indicator; for example, η=1 if there is an object at that pixel, and η=0 otherwise.

Figure 9:
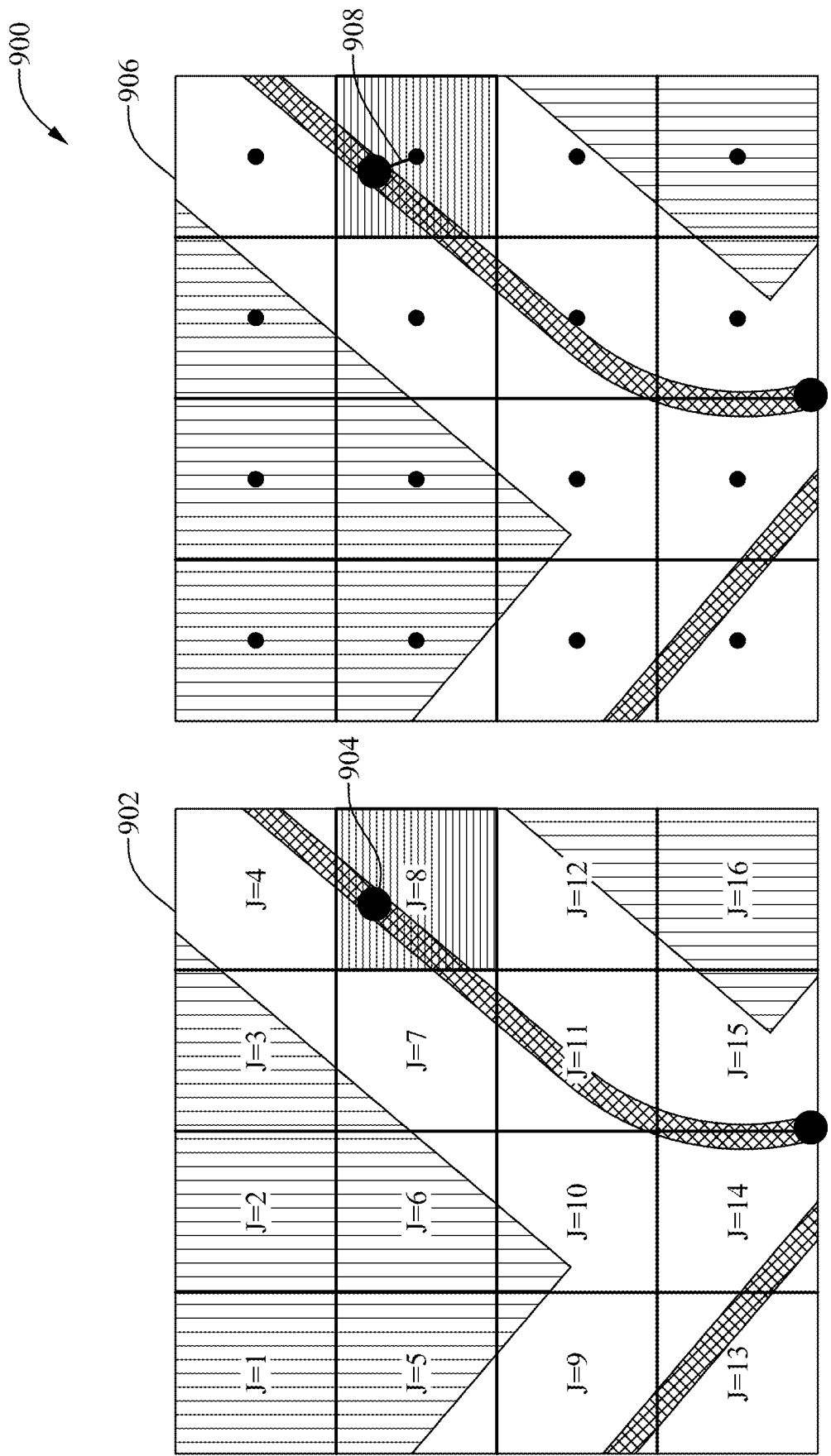
FIG. 9 is an illustration of a predicted position on the 2D grid in a cell and refinement of the predicted position by using an offset.

FIG. 9 shows an illustration 900 of a predicted position on the 2D grid in a cell 904 (in the left image 902) and refinement of the predicted position by using an offset 908 in x and y (in the right image 906).

According to various embodiments, the classification loss and the regression loss may be combined in a combined weighted loss.

Figure 10:
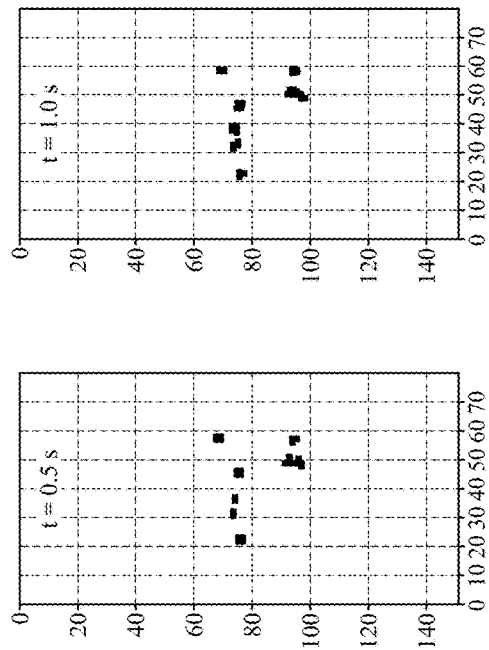
FIG. 10 is an output portion of a trajectory prediction.
Figure 10:
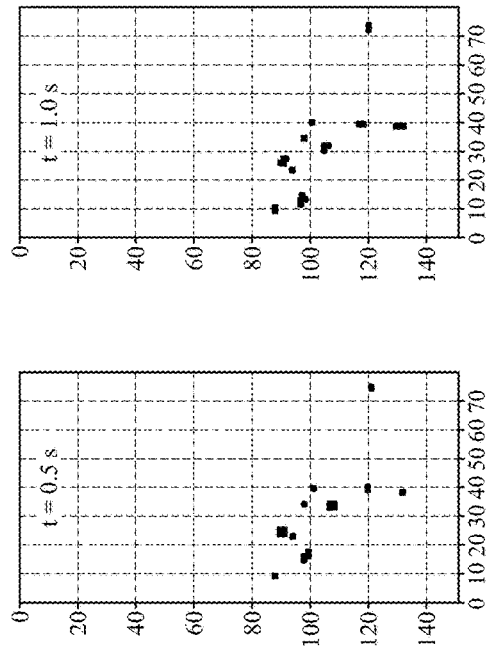

FIG. 4 shows an input for trajectory prediction, and FIG. 5 shows an illustration of a trajectory prediction output from the prediction system for a scene for 2 time steps, showing static context-awareness especially for the highlighted vehicle approaching the curve. FIG. 5 shows multimodal trajectories. The past trajectory may be following a straight line. To make an accurate prediction, not just the past trajectory is considered, but also the static context of the object like the course of a road. The outputs are shown in illustration 1000 of FIG. 10.

Figure 11:
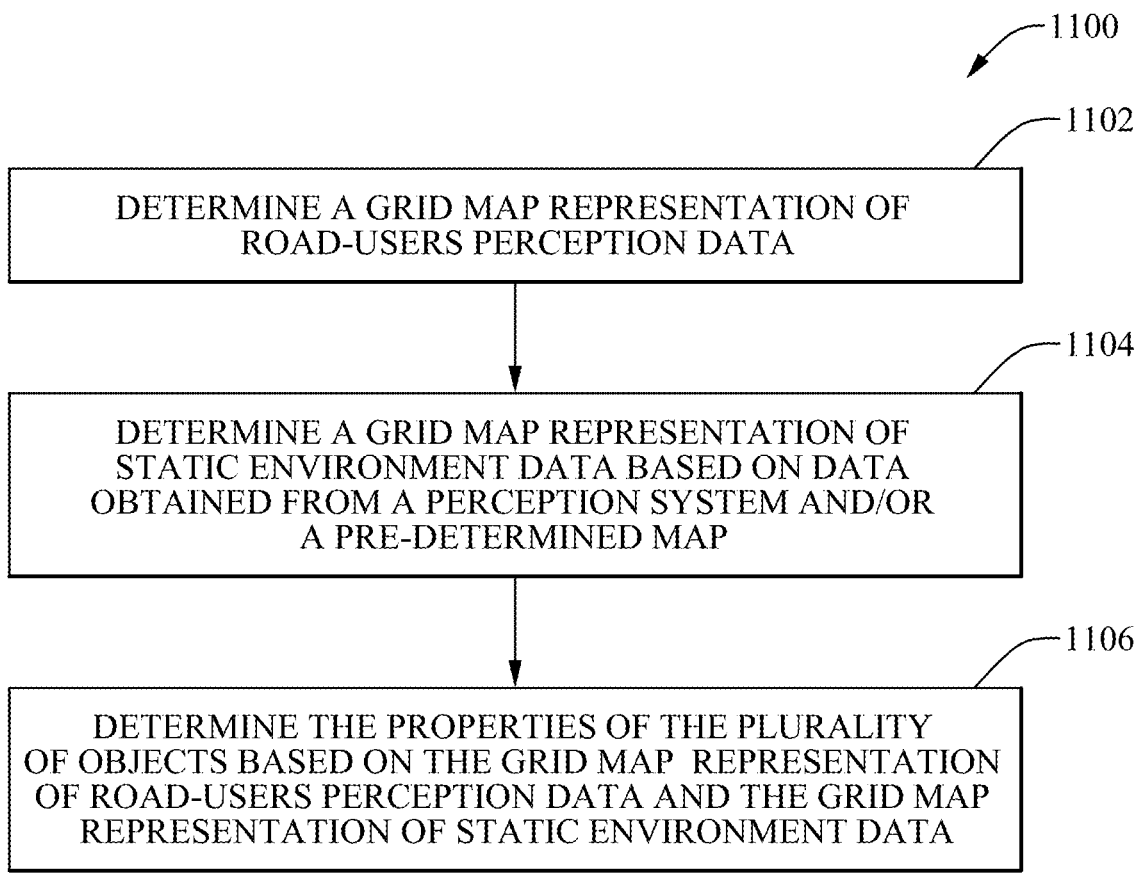
FIG. 11 is a flow diagram illustrating a method for predicting properties (for example positions) of a plurality of objects in a vicinity of a vehicle according to various embodiments.

FIG. 11 shows a flow diagram 1100 illustrating a method for predicting properties of a plurality of objects in a vicinity of a vehicle. At 1102, a grid map representation of road-users perception data may be determined. The road-users perception data may include or may be tracked perception results and/or untracked sensor intermediate detections. At 1104, a grid map representation of static environment data may be determined based on data obtained from a perception system and/or a pre-determined map. At 1106, the properties of the plurality of objects may be determined based on the grid map representation of road-users perception data and the grid map representation of static environment data.

According to various embodiments, the properties of the plurality of objects may be determined as a function of at least one variable point in time for which the properties are determined.

According to various embodiments, the properties of the plurality of objects may be determined in the form of $Y(t)=At^2+Bt^1+C$, wherein Y(t) denotes the properties (as a function of t), t denotes at least one point in time for which the properties are determined, and A, B, and C are constants, which are preferably used for sampling or interpolation or extrapolation at the variable time t, and which are preferably determined as variable output of a network.

According to various embodiments, the values of t may be discrete values taken from a set T, and the properties may then be given by Y={$C_t$}, t∈T, as described above.

According to various embodiments, the properties may be determined for a past point in time and/or a present point in time and/or a future point in time.

According to various embodiments, the properties of the plurality of objects may include or may be a probability matrix, wherein each entry of the probability matrix is related to a respective pre-determined region in the vicinity of the vehicle and indicates a probability of an object being present in the respective region at a time different from the pre-determined time; wherein the method may further include determining an offset to the center of the region for each of the entries of the probability matrix; and wherein preferably the offsets are determined using a regression method.

According to various embodiments, the grid map representation of road-users perception data may be determined further based on data from a perception system; and/or the grid map representation of static environment data may be determined further based on a pre-determined map.

According to various embodiments, the grid map representation of road-users perception data may be encoded using a dynamic context encoder; wherein the grid map representation of static environment data may be encoded using a static context encoder; and wherein the properties of the plurality of objects may be decoded using a decoder.

According to various embodiments, the classification method may include or may be a machine learning method, preferably an artificial neural network; wherein preferably the machine learning method is trained based on training data, with the training data including or being traffic situations of a plurality of objects moving over a plurality of time frames.

According to various embodiments, the properties of the plurality of objects may be determined for a plurality of classes, wherein the plurality of object classes may include or may be at least two of an ego vehicle class, a pedestrian class, a bicyclist class, a vehicle class, a truck class, a lorry class, a fast moving object class, or a slow moving object class.

Figure 12:
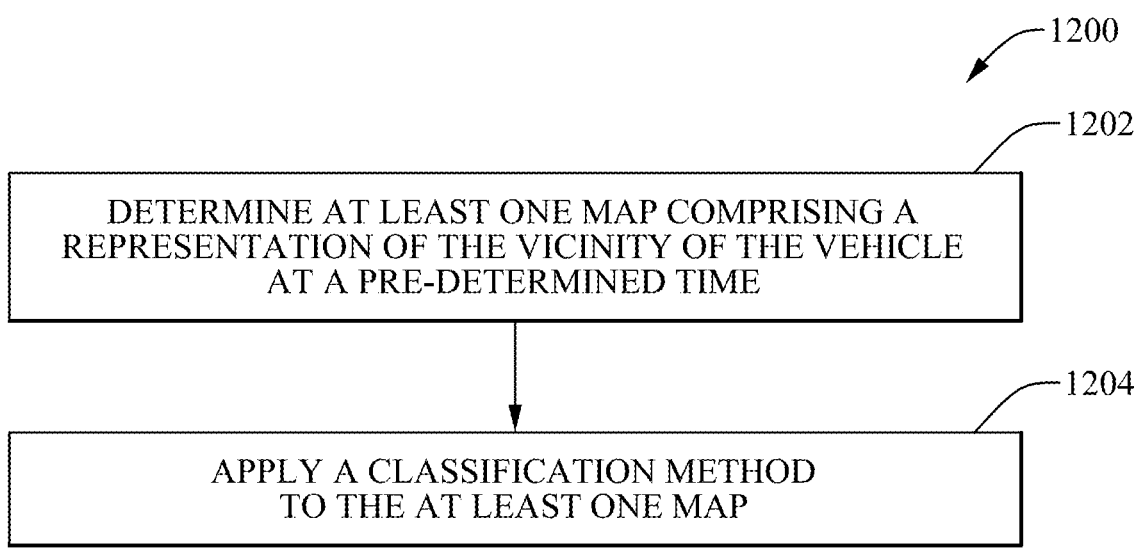
FIG. 12 is a flow diagram illustrating a method for predicting properties (for example positions) of a plurality of objects in a vicinity of a vehicle according to various embodiments.

FIG. 12 shows a flow diagram 1200 illustrating a method for predicting positions of a plurality of objects in a vicinity of a vehicle according to various embodiments. At 1202, at least one map including a representation of the vicinity of the vehicle at a pre-determined time may be determined. At 1204, a classification method may be applied to the at least one map, with the classification method providing as an output a probability matrix, wherein each entry of the probability matrix is related to a respective pre-determined region in the vicinity of the vehicle and indicates a probability of an object being present in the respective region at a time different from the pre-determined time.

According to various embodiments, the at least one (input) map may include or may be a map indicating a static context of the vicinity.

According to various embodiments, the at least one (input) map may include or may be a map indicating a dynamic context of the vicinity.

According to various embodiments, the classification method may include or may be a machine learning method, preferably an artificial neural network.

According to various embodiments, the machine learning method may be trained based on training data, with the training data comprising traffic situations of a plurality of objects moving over a plurality of time frames.

According to various embodiments, the machine learning method may be trained based on a loss function, wherein the loss function preferably includes or is a pixel-wise distance aware cross entropy.

According to various embodiments, the classification method may determine a plurality of probability matrices, with each probability matrix related to one of a plurality of object classes.

According to various embodiments, the plurality of object classes may include or may be at least two of a pedestrian class, a bicyclist class, a vehicle class, a truck class, a lorry class, a fast moving object class, or a slow moving object class.

According to various embodiments, the probability matrix may be related to a center of the respective pre-determined region, and the method may further include determining an offset to the center of the region for each of the entries of the probability matrix.

According to various embodiments, the offset may be determined based on a regression loss.

According to various embodiments, a plurality of probability matrices may be determined related to a plurality of times.

According to various embodiments, the method may further include determining an occupation matrix, wherein each entry of the occupation matrix may be related to a respective pre-determined region in the vicinity of the vehicle and indicate whether or not an object is present at the region, and wherein a corresponding entry of the probability matrix may only be determined if the entry of the occupation matrix indicates that an object is present at the region.

Each of the steps 1102, 1104, 1106, 1202, 1204, and the further steps described above may be performed by computer hardware components.

According to various embodiments, a method for predicting future positions of all registered (by a sensor) objects may be provided.

According to various embodiments, not only coordinates are used, but all measurements (e.g., velocity, acceleration, etc.). Furthermore, the past measurements, e.g. velocity, acceleration and the classes of single objects, e.g. car, bike, pedestrian may be used.

According to various embodiments, the occupancy grid or cost map is not only based on registered coordinates, but on dynamic context and static context, including the class of the objects. The occupancy grid or cost map according to various embodiments is made for future points in time, e.g. in 1 second, 2 seconds, etc. Hence, not only the current presence and/or vicinity of objects is described, but also the future ones. Furthermore, the class of each predicted object is determined.

According to various embodiments, the output layer is subdivided into cells and a cost value is assigned to each cell, and in addition, the exact positions of the objects may be refined by using additional offsets.

Figure 13:
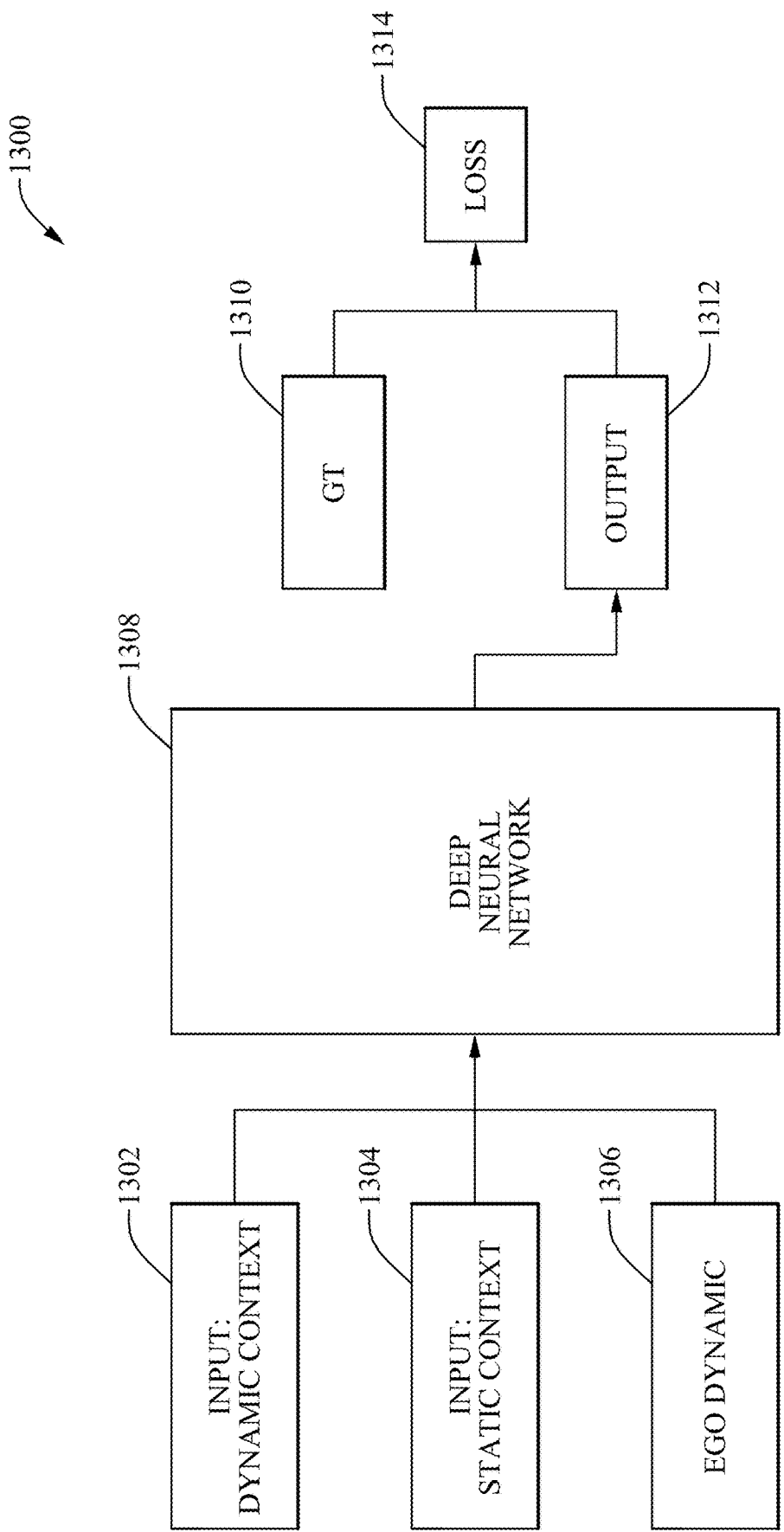
FIG. 13 is an illustration of the system according to various embodiments.

FIG. 13 shows an illustration 1300 of the system according to various embodiments. The inputs may include the dynamic context 1302, the static context 1304, and the ego dynamics 1306. A deep neural network 1308 may be used to generate the output 1312. When training the deep neural network 1308, the output 1312 and the ground truth (GT) 1310 may be provided to a loss function 1314 for optimization of the deep neural network 1308.

The dynamic context 1302 may include a series of images, which may describe the road users' movements in the past time frames. Possible sources for the dynamic context image are rasterized tracks of road users detected by sensors, or a dynamic occupancy grid which may be detected by sensors such as camera, radar, or lidar to represent the areas to represent the occupancy and velocities of an area (grid cell).

Possible representations and sources of the dynamic context image may include raw detections from the sensors, for example detected bounding boxes from camera (projected on the ground plane) or lidar sensors (with a similar approach for rasterization to images; multiple close or overlapped bounding boxes can belong to the same road user), or for example radar reflection points from moving objects (with a similar approach for rasterization to images). By doing so, "tracking" in the perception system may not be needed anymore. The network may work with raw sensor detections directly.

The static context 1304 may be represented by one or more of the following:

Rasterized image from the HD (high definition) map, wherein the high-definition map may cover the accurate lane markings position, so a vehicle's position may be accurately localized in the lanes;

Drivable area from sensors (for example a grid map or image data structure, wherein each pixel in this image may represent the drivability of the specific area in the field. This term may refer to the detected drivable area from sensors, such as camera, lidar or radar);

Lane/road detection from sensors (for example using the detected lane markings, road boundaries, guard rails, etc. from the sensor, one can also build a grip map or image like data (similar to rasterized Map) to describe the static context); and Static occupancy grid map (for example similar to "drivable area", an occupancy grid map (detected from sensor) could be used as static context input).

For the ego dynamic 1306, the ego vehicle may be represented as one road user and thus included in the dynamic context input. Depending on the output, when focused on prediction of Ego vehicle, the ego vehicle's data may be formulated also as: vector, separated image input, or separated channel of the dynamic context input.

The output 1312 may provide future positions of all road users. The output 1312 may be any function in time.

According to various embodiments, the output 1312 may have the following form $Y(t)=At^2+Bt^1+C$.

Y may denote the final output, and may be formulated in relation to t, so that prediction may be carried out at any given time. It will be understood that the 2nd-order function may serve as an example here.

The term "predict" may generally be used in artificial NN (neural networks) and it may mean that a NN takes an input and gives an output. As such, prediction does not necessarily indicate a temporal relation between input and output, while for the trajectory prediction according to various embodiments, prediction may mean anticipate something in the future. It will be understood that prediction as used herein may have the meaning of giving an estimation.

t may be the prediction time horizon. t may be negative, 0, or positive.

Negative t may mean estimation for the past. For example, we may classify the past maneuvers when more current data are given. Similar to the concept of "Kalman smoothing".

Zero t may mean estimation for the current time frame. If we are using raw sensor detections to create inputs, then prediction the trajectory at t=0 actually works as a "tracking" method.

Positive t may mean prediction for the future.

A, B, C may be different (from each other) and may be predicted 3D matrices. Each of A, B, C may represent the output grid map with size W×L and the 3rd dimension describes the various features it can predict (for example occupancy probability, in grid offsets, covariances of the predicted positions, possible maneuvers, or other features such as future velocity, for example).

With the output formulated as described above, a continuous prediction formulation regarding to time horizon t may be provided. It will be understood that the output as described above is merely an example, and that higher order or lower order (or any other non-linear function) may be used as an output.

According to various embodiments, the values of t may be discrete values taken from a set T, and the properties may then be given by $Y=\{C_t\}, t \in T$, as described herein.

According to various embodiments, the second order output $Y(t)=A*t^2+B*t+C$ may be provided as a first order with variable prediction horizon: $Y(t)=B*t+C$. Herein, the two outputs may be B and C. B may describe the part which is depending on t (thus moving), and C describes the part which is independent from t (thus static). In other words: B describes the agents which are moving, and C describes agents which are standing (i.e., not moving).

The output 1312 may describe future ego positions. When the ego vehicle's past trajectory is also given in the input dynamic context image (as described above), then the output can also cover the predictions for ego vehicle.

The ground truth 1310 may define the task of the artificial neural network. It may cover positions as occupancy probability and in-grid offsets or other regression and classification tasks, for example future positions, velocity, maneuvers etc. of the road users in the scenes as image.

Figure 14:
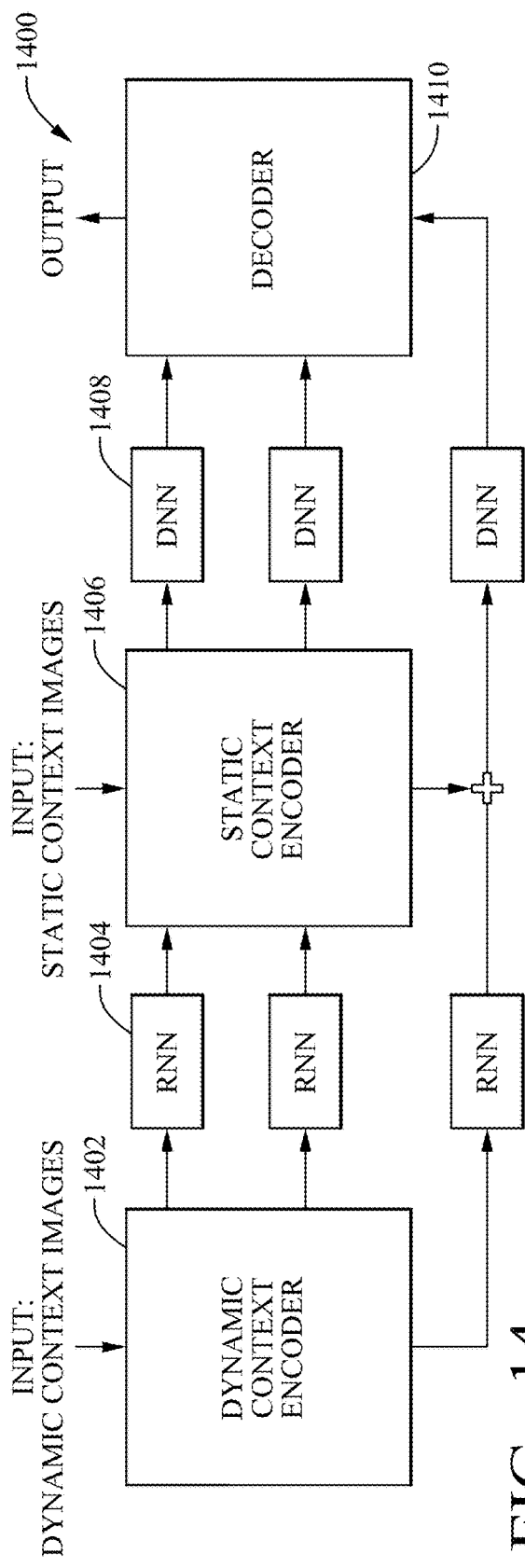
FIG. 14 is an illustration of a network architecture for a fixed static map.

FIG. 14 shows an illustration 1400 of a network architecture for a fixed static map. The dynamic context input 1402 may be provided to a recurrent neural network (RNN) 1404, the output of which, together with the static context input 1406, may be provided to a dilated neural network (DNN) 1408, the output of which may be provided to a decoder 1410 to provide the overall output.

Figure 15:
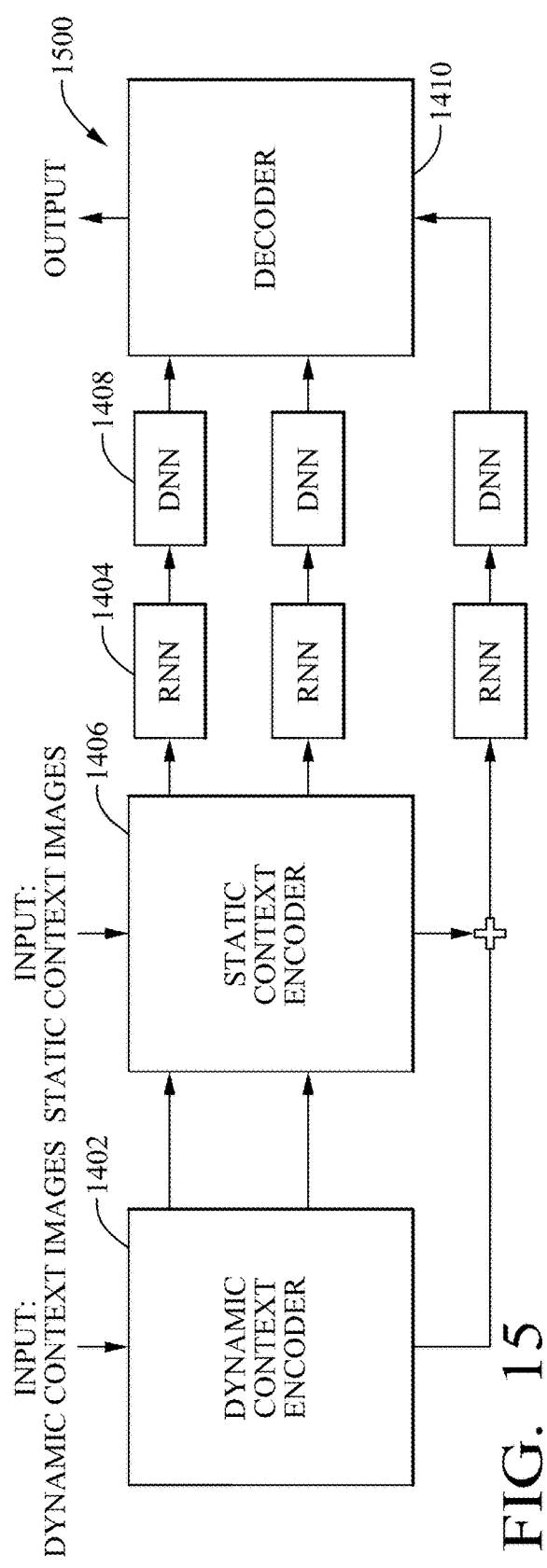
FIG. 15 is an illustration of a network architecture for a moveable static map.

FIG. 15 shows an illustration 1500 of a network architecture for a moveable static map. Compared to the network architecture of FIG. 14, both the dynamic context input 1402 and the static context input 1404 are provided to the RNN 1404, the output of which is provided to the DNN 1408.

An example urban traffic scenario may have various types of vehicles with different motions, variant number of pedestrians with different behaviors and motions. All these road users may have direct or indirect interactions among them, and at the same restricted by the static context: road/lane structures, etc. There may be an infinite number of different scenarios in urban traffic, which may be a challenging problem.

According to various embodiments, images may be used as system inputs and outputs. The output images may contain all the road users' future trajectories. Thus, according to various embodiments, a trajectory prediction problem may be converted to an image generation problem. This input and output data representation may allow invariance to the number and types of the road user, and invariance to specific static-context.

According to various embodiments, an HD map rasterization may be provided. The information of an HD map may be grouped into different categories (e.g., walking areas, driving areas, lane dividers and crossing areas) and assigned each category an own RGB (red-green-blue) color. The rasterization may be done category-wise. One category may be rasterized on top of each other, starting with larger areas like driving areas and ending with smaller ones, e.g. lane dividers.

According to various embodiments, a trajectory rasterization may be provided. A road user's trajectory may be defined as a series of points at continuous time frames. Each point includes features, such as: target position (x,y), velocities, accelerations, types, size, orientation.

A fixed region of interest (ROI) around the ego vehicle may first be rasterized as an empty multi-channel image, with each pixel covers a fixed area. For example, an 80×80 meters of ROI in front of the ego vehicle can be rasterized into an 80×80 pixel image, with each pixel represents a 1×1 meter square area. It will be understood that the x and y resolutions can be different.

At each time frame, all road users' positions may be rasterized as pixel positions in the image, and their trajectory features at the time frames may be stored at their corresponding pixels.

The above process can be repeated for all continuous time frames, thus a series of images may be generated representing all road users' trajectories.

During the above process, each road user may be considered as a point-object, thus only located in one pixel. Alternatively, the road user's shape, size and orientation can all be considered, thus rasterized into multiple connected pixels.

Because of the input and output formulation, the motion prediction of a whole scene may be converted to an image generation problem.

Figure 16:
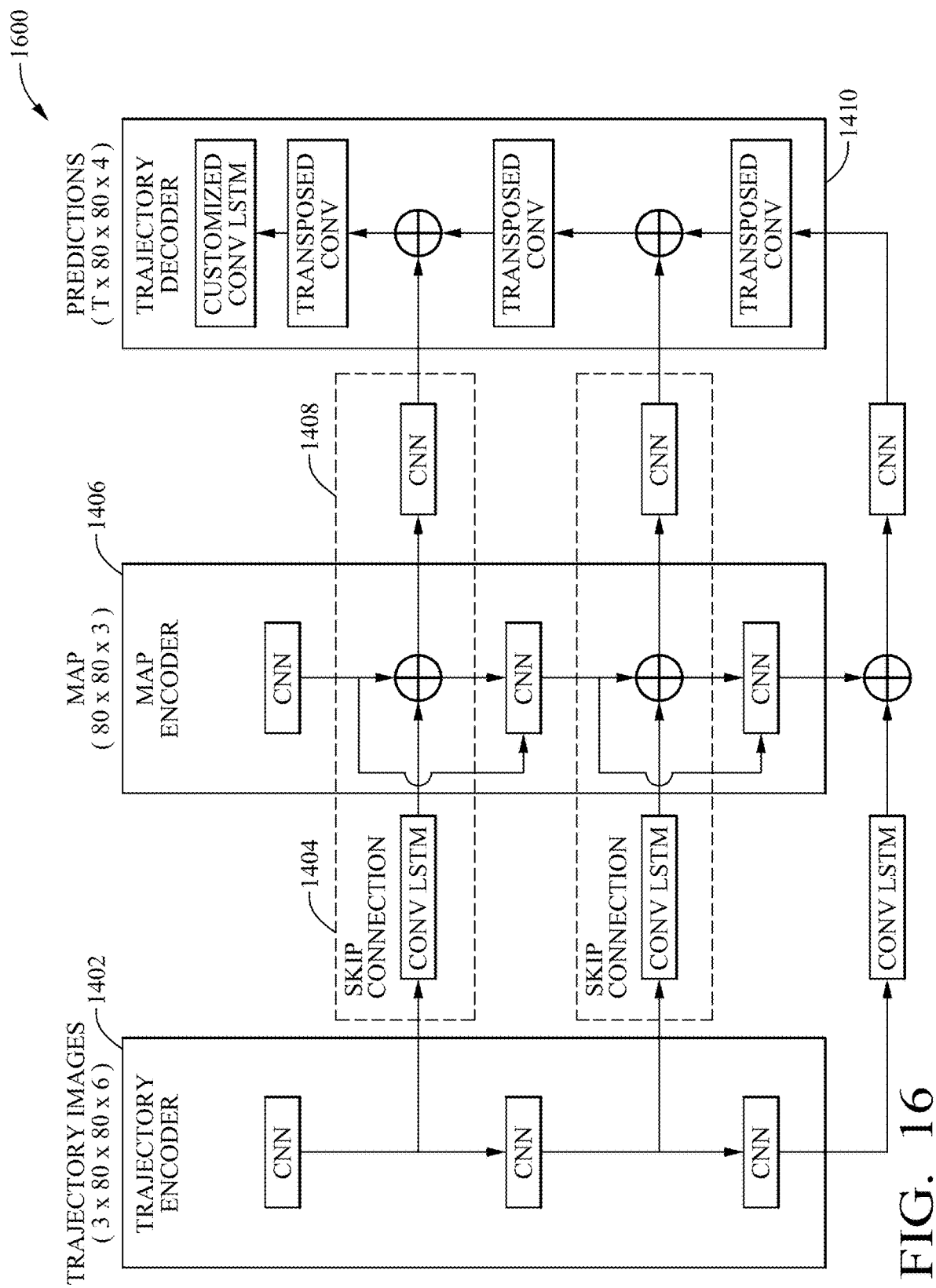
FIG. 16 is an illustration of the overall system architecture.

FIG. 16 shows an illustration 1600 of the overall system architecture. Various portions are similar or identical to the architecture shown in FIG. 14, so that the same reference signs may be used and duplicate description may be omitted. It will be understood that the specific input size and number of network layers shown in FIG. 16 are for illustrative purpose only.

At each past time frame, the positions of all road users may be represented in a multi-channel image. A series of such images may represent the motion of the whole scene in the temporal domain.

Convolutional neural networks (CNNs) are good at learning the correlation among the data under its kernels. In the input, such data correlation may be intuitively understood as the possible interactions among road users and the subsequent effects on their behaviors and trajectories. Thus, a CNN may be provided to build the trajectory encoder. A multi-layer of the CNN may be applied on the image data, and this network may be referred to as trajectory encoder.

Map integration into the prediction system may be provided using CNN to extract features from the map and jointly learned with the trajectory prediction. This network may be referred to as map encoder.

According to various embodiments, skip connections with convolutional long short-term memory (ConvLSTM) may be provided.

As the trajectory data may be a series of images processed by the trajectory encoder, whose output is also a series of feature maps, a convolutional recurrent neural network (ConvRNN), for example a ConvLSTM, may be applied to learn the motion in the temporal domain.

Because various types of road users have different maneuverability, their range of motion at a fixed time horizon may be very different. For example, a pedestrian may move 1 meter at 1 second time horizon, but a vehicle may have moved 10 meters.

Also, the interaction among the road users may happen at different scales. Pedestrians may already avoid bumping into each other a few meters in advance, but vehicles may require a longer distance. Thus, the final CNN layer with a wide receptive field may not be optimal to capture all these different motions and interactions.

Considering the different receptive fields of different CNN layers, "skip connections" may be provided by giving each trajectory encoder layer's output to trajectory decoder. RNN (convLSTM) may be integrated at the skip connections for time series data processing. This makes this architecture from a single image process to a time series data process framework. Static context features may be integrated (for example by concatenation) with the output features after the convLSTM also through the skip connections. This may allow using different rasterization resolution, or different layers of CNN for map encoder. If the rasterized map and trajectory images have the same resolution and size, they may be concatenated and given as input to the trajectory decoder.

According to various embodiments, a trajectory decoder may be provided. To generate the output image, the transposed convolution network may be applied. Through the skip connections, the time series trajectory (images) data may be passed to the decoder at different levels and processed to the final output.

The output at each prediction time horizon may include:

An image, which may be denoted as $I_t$, which may represent the predicted position at future time horizon t. $I_t$ may have N different channels, denoted as $I_t^n$, wherein each channel may present the prediction for one type of road user, such as pedestrian or vehicle. The pixel value, between [0,1], of the image may represent the possibility (or probability) of that pixel being occupied.

A two-channel image $O_t$, the pixel values of which may represent the in-pixel x and y offsets when this pixel is predicted as the future position in $I_t$. This may be because the input and output are all rasterized images, each pixel in such images may have a fixed and limited resolution. For example, one pixel may represent a 1 m×1 m area in the real world. To achieve better accuracy, the in-pixel offsets may be predicted also as a two-channel image. These in-pixel offsets may be regardless of the specific type of road users. According to various embodiments, for each $I_t^n$ a specific offset $O_t$ may be provided. The offsets may be for all the types of road users.

According to various embodiments, iterative outputs may be provided. Instead of predicting at fix time horizons, the system according to various embodiments may use a customized ConvLSTM. One difference of this ConvLSTM to a conventional one is that it only needs input at first iteration. At each iteration, it outputs a prediction at +Δt future time horizon. Δt is the time interval between two consecutive prediction time horizons. Thus, when iteratively running this last output layer, a series of predictions at Δt, 2Δt, 3Δt, . . . may be obtained. This flexibility may allow the users to decide how far in the future he wants to predict. This customized ConvLSTM may require only input at the beginning.

Figure 17:
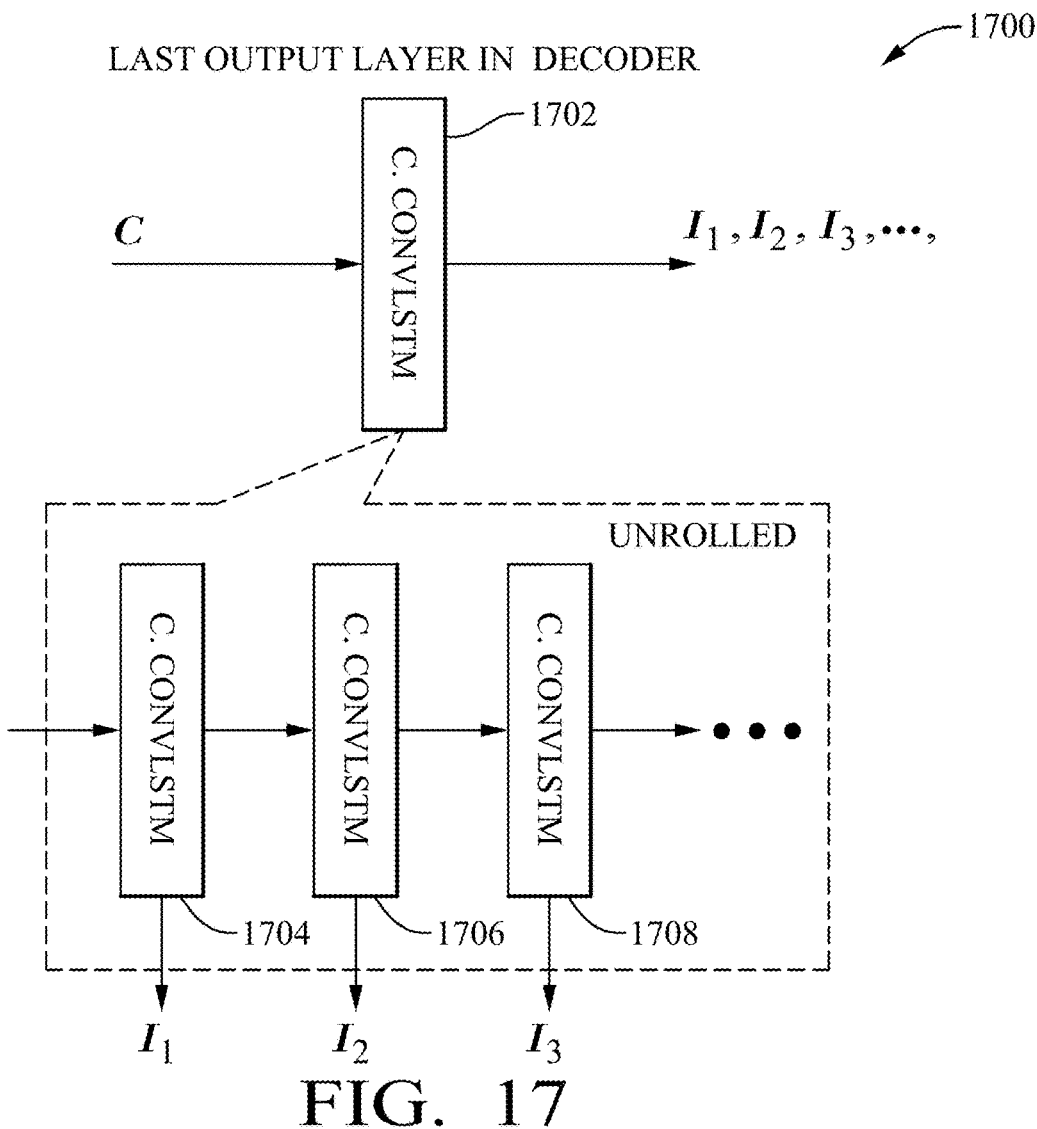
FIG. 17 is an illustration of the un-rolled diagram.

FIG. 17 shows an illustration 1700 of the un-rolled diagram. A cony LSTM layer 1702 may be the last output layer of the decoder, and, in an unrolled view, a plurality of cony LSTM layers 1704, 1706, 1708 may be provided to provide a plurality of outputs I_1, I_2, I_3. The input C shown on the left side of FIG. 17 may be the feature output of preview NN (neural network) layers. Thus, C may be provided to the convLSTM and may iteratively be decoded to multiple output grid maps. The layers 1702, 1704, 1706, 1708 are actually the same convLSTM 1702, which are illustrated in this way for demonstration of "iteratively calling". Thus, the layers 1704, 1706, 1708 are actually all 1702, but at different (i.e., subsequent) iterations.

Figure 18:
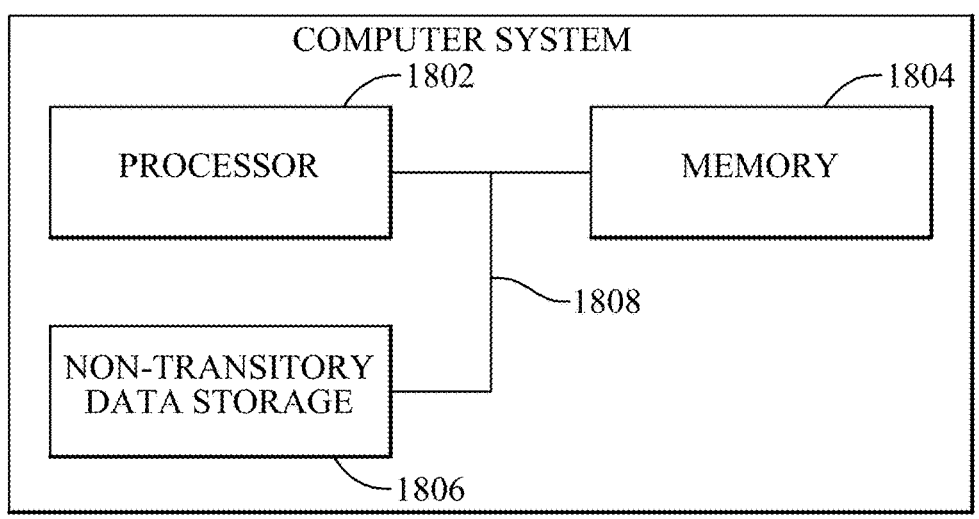
FIG. 18 is a computer system with a plurality of computer hardware components configured to carry out steps of a computer-implemented method as described herein.

FIG. 18 shows a computer system 1800 with a plurality of computer hardware components configured to carry out steps of a computer-implemented method as described herein. The computer system 1800 may include a processor 1802, a memory 1804, and a non-transitory data storage 1806. Various sensors (not shown in FIG. 18) may be provided as part of the computer system 1800, or they may be provided external to the computer system 1800.

The processor 1802 may carry out instructions provided in the memory 1804. The non-transitory data storage 1806 may store a computer program, including the instructions that may be transferred to the memory 1804 and then executed by the processor 1802.

The processor 1802, the memory 1804, and the non-transitory data storage 1806 may be coupled with each other, e.g. via an electrical connection 1808, such as e.g. a cable or a computer bus or via any other suitable electrical connection to exchange electrical signals.

The terms "coupling" or "connection" are intended to include a direct "coupling" (for example via a physical link) or direct "connection" as well as an indirect "coupling" or indirect "connection" (for example via a logical link), respectively.

It will be understood that what has been described for one of the methods above may analogously hold true for the computer system 1800.

As described herein, a general motion prediction framework, for example including a machine learning system using dynamic and static context inputs may be provided for estimation of various features of the past, current, and future.

As described herein, according to various embodiments, the trajectory prediction may be formulated as an image generation problem, thus making it possible to predict the whole scene motion in a general applicable framework.

CNN may be chosen for trajectory and map encoding, which may efficiently learn the interaction among the road users (dynamic context) and the interaction with the static context (static context).

The architecture may consider that road users have different maneuverability. RNN may be integrated into the system (in addition to CNN based encoders and decoder) to capture the road users' dynamic in a temporal domain.

An iterative output layer provided in the decoder may provide the flexibility of variable prediction horizons.

The methods and systems according to various embodiments provide good scalability (for example, simple to complex scenarios may be handled with the same system). The system complexity may be invariant to road user number and types, with a relatively fixed system computational requirement, which may be important for functional safety.

According to various embodiments, a general system architecture and general input representation may be provided, which may take various types of input data, for example including tracked objects and/or raw detections, for various types of applications, including tracking, fusion and prediction.

Various embodiments may provide (dynamic and static) context awareness per ML (machine learning) for trajectory prediction covering various complex driving scenarios.

Various embodiments may provide efficient prediction, for example invariant to the number of road users.

EXAMPLE IMPLEMENTATIONS

Example 1: A computer-implemented method for predicting properties of a plurality of objects in a vicinity of a vehicle, the method comprising the following steps carried out by computer hardware components: determining a grid map representation of road-users perception data, the road-users perception data comprising tracked perception results and/or untracked sensor intermediate detections; determining a grid map representation of static environment data based on data obtained from a perception system and/or a pre-determined map; and determining the properties of the plurality of objects based on the grid map representation of road-users perception data and the grid map representation of static environment data.

Example 2: The computer-implemented method of example 1, wherein the properties of the plurality of objects are determined as a function of at least one variable point in time for which the properties are determined.

Example 3: The computer-implemented method of example 2, wherein the properties of the plurality of objects are determined in the form of $Y(t)=At^2+Bt^1+C$, wherein Y denotes the properties, t denotes at least one point in time for which the properties are determined, and A, B, and C are constants, which are preferably used for sampling or interpolation or extrapolation at the variable time t, and which are preferably determined as variable output of a machine learning method, preferably an artificial neural network.

Example 4: The computer-implemented method of example 2, wherein the properties of the plurality of objects can also be determined at discrete points in time.

Example 5: The computer-implemented method of at least one of examples 1 to 4, wherein the properties are determined for a past point in time and/or a present point in time and/or a future point in time.

Example 6: The computer-implemented method of at least one of examples 1 to 5, wherein the properties of the plurality of objects comprises a probability matrix, wherein each entry of the probability matrix is related to a respective pre-determined region in the vicinity of the vehicle and indicates a probability of an object being present in the respective region at time t; wherein the computer implemented method further comprises determining an offset to the center of the region for each of the entries of the probability matrix; and wherein preferably the offsets are determined using a regression method.

Example 7: The computer-implemented method of at least one of examples 1 to 6, wherein the grid map representation of road-users perception data is encoded using a dynamic context encoder; wherein the grid map representation of static environment data is encoded using a static context encoder; and wherein the properties of the plurality of objects are decoded using a decoder.

Example 8: The computer-implemented method of example 7, wherein a recurrent neural network is provided between the dynamic context encoder and the static context encoder, and a dilated neural network is provided between the static context encoder and the decoder; or wherein a recurrent neural network and a dilated neural network are provided between the static context encoder and the decoder.

Example 9: The computer-implemented method of at least one of examples 1 to 8, wherein the classification method comprises a machine learning method, preferably an artificial neural network, preferably comprising a plurality of skip-connections with temporal filtering in a pyramid neural network architecture; and wherein preferable the machine learning method is trained based on training data, the training data comprising traffic situations of a plurality of objects moving over a plurality of time frames.

Example 10: The computer-implemented method of at least one of examples 1 to 9, wherein the properties of the plurality of objects are determined for a plurality of classes, wherein the plurality of object classes comprise at least two of an ego vehicle class, a pedestrian class, a bicyclist class, a vehicle class, a truck class, a lorry class, a fast moving object class, or a slow moving object class.

Example 11: The computer-implemented method of at least one of examples 1 to 10, wherein the properties of the plurality of objects comprise at least one of positions, speeds, heading angles, intentions, or collision risk values.

Example 12: The computer-implemented method of at least one of examples 1 to 11, wherein the computer-implemented method is used for fusion or for prediction.

Example 13: A computer system, the computer system comprising a plurality of computer hardware components configured to carry out steps of the computer-implemented method of at least one of examples 1 to 12.

Example 14: A vehicle comprising: the computer system of example 13; and a sensor configured to provide sensor data, wherein the grid map representation of road-users perception data and/or the grid map representation of static environment data is determined based on the sensor data.

Example 15: A non-transitory computer-readable medium comprising instructions for carrying out the computer-implemented method of at least one of examples 1 to 12.

List of Reference Characters for the Items in the Drawings

The following is a list of certain items in the drawings, in numerical order. Items not included in the list may nonetheless be part of a given embodiment. For better legibility of the text, a given reference character may be recited near some, but not all, recitations of the referenced item in the text. The same reference number may be used with reference to different examples or different instances of a given item.

100 illustration of a static map
102 obstacle
104 road
106 possible position
108 possible position
110 possible position
112 future trajectory
200 illustration static map
202 possible position
300 illustration of static map
302 center of cell
400 illustration of static context and dynamic context
402 static context
404 dynamic context
500 illustration of a whole scene prediction system according to various embodiments
502 vehicle
504 past trajectory
506 various positions
508 pedestrian
510 pedestrian
600 illustration of the output structure according to various embodiments
602 axis
604 direction
606 output images
700 illustration of classification output according to various embodiments
702 left image
704 positions
706 right image
708 positions
800 illustration of predictions, a target and an example of a gaussian kernel
802 left image
804 right image
806 target
808 predictions
900 illustration of a predicted position and refinement of the predicted position
902 left image
904 cell
906 right image
908 offset
1000 illustration of outputs
1100 flow diagram illustrating a method for predicting properties of a plurality of objects in a vicinity of a vehicle
1102 step of determining a grid map representation of road-users perception data
1104 step of determining a grid map representation of static environment data
1106 step of determining the properties of the plurality of objects
1200 flow diagram illustrating a method for predicting positions of a plurality of objects in a vicinity of a vehicle according to various embodiments
1202 step of determining at least one map including a representation of the vicinity of the vehicle at a pre-determined time
1204 step of applying a classification method to the at least one map
1300 illustration of the system according to various embodiments
1302 dynamic context
1304 static context
1306 ego dynamics
1308 deep neural network
1310 ground truth
1312 output
1314 loss function
1400 illustration of a network architecture for a fixed static map
1402 dynamic context input
1404 recurrent neural network
1406 static context input
1408 dilated neural network
1410 decoder
1500 illustration of a network architecture for a moveable static map
1600 illustration of overall system architecture
1700 illustration of un-rolled diagram
1702 cony LSTM layer
1704 cony LSTM layer
1706 cony LSTM layer
1708 cony LSTM layer
1800 computer system according to various embodiments
1802 processor
1804 memory
1806 non-transitory data storage
1808 connection

What is claimed is:

1. A computer-implemented method comprising:
determining a grid map representation of road-users perception data, the road-users perception data comprising at least one of tracked detections or untracked detections based on radar data or camera data, and the grid map representation of road-users perception data being encoded using a dynamic context encoder;
determining a grid map representation of static environment data based on data obtained from at least one of a perception system or a pre-determined map, the grid map representation of static environment data being encoded using a static context encoder;
determining properties of a plurality of objects located within a vicinity of a vehicle based on the grid map representation of road-users perception data and the grid map representation of static environment data, the properties of the plurality of objects being decoded using a decoder; and
performing at least partially autonomous driving of the vehicle based on the determined properties of the plurality of objects;
wherein a recurrent neural network is provided between the dynamic context encoder and the static context encoder, and a dilated neural network is provided between the static context encoder and the decoder.

2. The computer-implemented method of claim 1, wherein the determining properties comprises:

determining the properties of the plurality of objects as a function of at least one variable point in time for which the properties are determined.

3. The computer-implemented method of claim 2, wherein the determining the properties comprises:
determining the properties of the plurality of objects in a form of $Y(t)=At^2+Bt^1+C$, wherein:
Y denotes the properties,
t denotes at least one point in time for which the properties are determined, and
A, B, and C are constants.

4. The computer-implemented method of claim 3, wherein:
the constants A, B, and C are used for at least one of sampling, interpolation, or extrapolation at a variable time t.

5. The computer-implemented method of claim 3, wherein:
the constants A, B, and C are determined as variable output of a machine learning method.

6. The computer-implemented method of claim 2, wherein the determining the properties comprises:
determining the properties of the plurality of objects at one or more discrete points in time.

7. The computer-implemented method of claim 1, wherein the determining properties comprises:
determining the properties of the plurality of objects for at least one of a past point in time, a present point in time, or a future point in time.

8. The computer-implemented method of claim 1, wherein:
the properties of the plurality of objects comprise a probability matrix, wherein each entry of multiple entries of the probability matrix is related to a respective pre-determined region in a vicinity of a vehicle and indicates a probability of an object being present in the respective pre-determined region at time t; and
the computer-implemented method further comprises determining an offset to a center of the respective pre-determined region for each entry of the multiple entries of the probability matrix.

9. The computer-implemented method of claim 8, wherein the determining an offset comprises:
determining the offset to the center of the respective pre-determined region for each entry of the multiple entries of the probability matrix using a regression method.

10. The computer-implemented method of claim 1, wherein:
the method is performed using, at least partially, a machine learning method.

11. The computer-implemented method of claim 10, wherein:
the machine learning method is implemented, at least partially, using an artificial neural network.

12. The computer-implemented method of claim 11, wherein:
the artificial neural network comprises a plurality of skip-connections with temporal filtering in a pyramid neural network architecture.

13. The computer-implemented method of claim 10, wherein:
the machine learning method is trained based on training data; and
the training data comprises traffic situations of multiple objects moving over a plurality of time frames.

14. The computer-implemented method of claim 1, wherein:
the determining properties comprises determining the properties of the plurality of objects for a plurality of object classes; and
the plurality of object classes comprises at least two of an ego vehicle class, a pedestrian class, a bicyclist class, a vehicle class, a truck class, a lorry class, a fast-moving object class, or a slow-moving object class.

15. The computer-implemented method of claim 1, wherein:
the properties of the plurality of objects comprise at least one of positions, speeds, heading angles, intentions, or collision risk values.

16. The computer-implemented method of claim 1, further comprising:
using the computer-implemented method for at least one of fusion or prediction.

17. A computer system comprising:
a plurality of computer hardware components including at least one processor and at least one memory, the plurality of computer hardware components configured to:
determine a grid map representation of road-users perception data, the road-users perception data comprising at least one of tracked detections or untracked detections based on radar data or camera data, and the grid map representation of road-users perception data being encoded using a dynamic context encoder;
determine a grid map representation of static environment data based on data obtained from at least one of a perception system or a pre-determined map, the grid map representation of static environment data being encoded using a static context encoder;
determine properties of a plurality of objects located within a vicinity of a vehicle based on the grid map representation of road-users perception data and the grid map representation of static environment data, the properties of the plurality of objects being decoded using a decoder; and
perform at least partially autonomous driving of the vehicle based on the determined properties of the plurality of objects;
wherein a recurrent neural network is provided between the dynamic context encoder and the static context encoder, and a dilated neural network is provided between the static context encoder and the decoder.

18. A vehicle comprising:
at least one sensor configured to provide sensor data; and
a plurality of computer hardware components including at least one processor and at least one memory, the plurality of computer hardware components coupled to the at least one sensor and configured to:
determine a grid map representation of road-users perception data, the road-users perception data comprising at least one of tracked detections or untracked detections based on radar data or camera data, and the grid map representation of road-users perception data being encoded using a dynamic context encoder;
determine a grid map representation of static environment data based on data obtained from at least one of a perception system or a pre-determined map, the grid map representation of static environment data being encoded using a static context encoder;

determine properties of a plurality of objects located within a vicinity of a vehicle based on the grid map representation of road-users perception data and the grid map representation of static environment data, the properties of the plurality of objects being decoded using a decoder; and perform at least partially autonomous driving of the vehicle based on the determined properties of the plurality of objects;

wherein:

at least one of the grid map representation of road-users perception data or the grid map representation of static environment data being determined based on the sensor data; and a recurrent neural network is provided between the dynamic context encoder and the static context encoder, and a dilated neural network is provided between the static context encoder and the decoder.

* * * * *